(12) United States Patent
Alaia et al.

(10) Patent No.: US 7,792,707 B2
(45) Date of Patent: *Sep. 7, 2010

(54) METHOD AND SYSTEM FOR CONTROLLING THE INITIATION AND DURATION OF OVERTIME INTERVAL IN ELECTRONIC AUCTIONS

(75) Inventors: Marc Alaia, Glenshaw, PA (US); David J. Becker, Sewickley, PA (US); Anthony F. Bernard, Wexford, PA (US); Daniel C. Heckmann, Pittsburgh, PA (US); Sam E. Kinney, Jr., Sewickley, PA (US); Glen T. Meakem, Sewickley, PA (US); Vincent F. Rago, Pittsburgh, PA (US); Jason W. Reneau, Boston, MA (US); Frederick W. Roberts, Pittsburgh, PA (US); William D. Rupp, Pittsburgh, PA (US); Robert G. Stevens, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/974,523

(22) Filed: Oct. 11, 2007

(65) Prior Publication Data

US 2008/0133377 A1 Jun. 5, 2008

Related U.S. Application Data

(60) Continuation of application No. 09/828,731, filed on Apr. 9, 2001, now Pat. No. 7,283,980, which is a continuation of application No. 09/311,557, filed on May 14, 1999, now Pat. No. 6,216,114, which is a division of application No. 09/252,790, filed on Feb. 19, 1999, now Pat. No. 6,230,146.

(60) Provisional application No. 60/101,141, filed on Sep. 18, 1998, provisional application No. 60/110,846, filed on Dec. 4, 1998.

(51) Int. Cl.
G06Q 40/00 (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS 3,581,072 A   5/1971   Nymeyer (Continued)

FOREIGN PATENT DOCUMENTS

CA   2069955   6/1991

(Continued)

OTHER PUBLICATIONS

U.S. Appl. No. 11/974,523, published Oct. 11, 2007, Alaia et al.
U.S. Appl. No. 09/490,877, published Jan. 24, 2000, Sam E. Kinney, Jr.
U.S. Appl. No. 09/490,868, published Jan. 24, 2000, Kinney et al.

(Continued)

*Primary Examiner*—Jagdish N Patel
(74) *Attorney, Agent, or Firm*—Van Pelt, Yi & James LLP

(57) ABSTRACT

Control of overtime in an auction is disclosed. A first time interval, a second time interval, and a first closing time for a first lot are defined. It is determined that at least one new bid for the first lot is received during the first time interval. The new bid is received close to the first closing time. The first closing time is extended using the second time interval if the correlation between the new bid and the at least one other bid satisfies a trigger criterion that is based on a rank of the new bid and the at least one other bid.

20 Claims, 15 Drawing Sheets

U.S. PATENT DOCUMENTS

| | | | |
|---|---|---|---|
| 3,863,060 | A | 1/1975 | Rode et al. |
| 4,597,045 | A | 6/1986 | Kiuchi |
| 4,674,044 | A | 6/1987 | Kalmus et al. |
| 4,789,928 | A | 12/1988 | Fujisaki |
| 4,799,156 | A | 1/1989 | Shavit et al. |
| 4,842,275 | A | 6/1989 | Tsatskin |
| 4,845,625 | A | 7/1989 | Stannard |
| 4,992,940 | A | 2/1991 | Dworkin |
| 5,136,501 | A | 8/1992 | Silverman et al. |
| 5,193,056 | A | 3/1993 | Boes |
| 5,243,515 | A | 9/1993 | Lee |
| 5,297,032 | A | 3/1994 | Trojan et al. |
| 5,375,055 | A | 12/1994 | Togher et al. |
| 5,394,324 | A | 2/1995 | Clearwater |
| 5,402,336 | A | 3/1995 | Spiegelhoff et al. |
| 5,606,602 | A | 2/1997 | Johnson et al. |
| 5,629,982 | A * | 5/1997 | Micali .................. 380/30 |
| 5,640,569 | A | 6/1997 | Miller et al. |
| 5,664,115 | A | 9/1997 | Fraser |
| 5,684,963 | A | 11/1997 | Clement |
| 5,689,652 | A | 11/1997 | Lupien et al. |
| 5,715,402 | A | 2/1998 | Popolo |
| 5,721,735 | A | 2/1998 | Smiroldo |
| 5,727,165 | A | 3/1998 | Ordish et al. |
| 5,758,327 | A | 5/1998 | Gardner et al. |
| 5,758,328 | A | 5/1998 | Giovannoli |
| 5,765,138 | A | 6/1998 | Aycock et al. |
| 5,774,873 | A | 6/1998 | Berent et al. |
| 5,794,207 | A | 8/1998 | Walker et al. |
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A * | 9/1998 | Mossberg .................. 283/67 |
| 5,809,483 | A | 9/1998 | Broka et al. |
| 5,826,244 | A * | 10/1998 | Huberman .................. 705/37 |
| 5,832,496 | A | 11/1998 | Anand et al. |
| 5,835,896 | A * | 11/1998 | Fisher et al. .................. 705/37 |
| 5,862,223 | A | 1/1999 | Walker et al. |
| 5,890,138 | A * | 3/1999 | Godin et al. .................. 705/26 |
| 5,897,621 | A | 4/1999 | Boesch et al. |
| 5,905,974 | A * | 5/1999 | Fraser et al. .............. 705/36 R |
| 5,905,975 | A | 5/1999 | Ausubel |
| 5,915,209 | A | 6/1999 | Lawrence |
| 5,966,699 | A | 10/1999 | Zandi |
| 6,014,627 | A | 1/2000 | Togher et al. |
| 6,021,398 | A * | 2/2000 | Ausubel .................. 705/37 |
| 6,023,685 | A * | 2/2000 | Brett et al. .................. 705/37 |
| 6,026,383 | A | 2/2000 | Ausubel |
| 6,044,363 | A | 3/2000 | Mori et al. |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,151,589 | A | 11/2000 | Aggarwal et al. |
| 6,161,099 | A | 12/2000 | Harrington et al. |
| 6,199,050 | B1 | 3/2001 | Alaia et al. |
| 6,216,114 | B1 | 4/2001 | Alaia et al. |
| 6,223,167 | B1 | 4/2001 | Alaia et al. |
| 6,230,146 | B1 | 5/2001 | Alaia et al. |
| 6,230,147 | B1 | 5/2001 | Alaia et al. |
| 6,243,691 | B1 | 6/2001 | Fisher et al. |
| 6,266,652 | B1 | 7/2001 | Godin et al. |
| 6,285,989 | B1 | 9/2001 | Shoham |
| 6,366,891 | B1 | 4/2002 | Feinberg |
| 6,401,080 | B1 | 6/2002 | Bigus et al. |
| 6,408,283 | B1 | 6/2002 | Alaia et al. |
| 6,415,269 | B1 | 7/2002 | Dinwoodie |
| 6,499,018 | B1 | 12/2002 | Alaia et al. |
| 6,564,192 | B1 | 5/2003 | Kinney et al. |
| 6,871,191 | B1 | 3/2005 | Kinney, Jr. |
| 7,010,511 | B1 | 3/2006 | Kinney et al. |
| 7,152,043 | B2 | 12/2006 | Alaia et al. |
| 7,249,085 | B1 | 7/2007 | Kinney et al. |
| 7,283,980 | B2 | 10/2007 | Alaia et al. |
| 2009/0112726 | A1 * | 4/2009 | Miller et al. .................. 705/26 |

FOREIGN PATENT DOCUMENTS

| | | |
|---|---|---|
| CA | 2080452 | 5/1993 |
| CA | 2298 481 | 9/1998 |
| EP | 0 399 850 | 11/1990 |
| JP | 09-101994 | 4/1997 |
| JP | 10-078992 | 3/1998 |
| WO | WO 92/15174 | 9/1992 |
| WO | 97/37315 | 10/1997 |
| WO | WO 97/37315 | 10/1997 |
| WO | WO 98/34187 | 8/1998 |
| WO | WO 99/63461 | 12/1998 |
| WO | WO 99/63461 | 12/1999 |
| WO | WO 00/17797 | 3/2000 |
| WO | WO 00/79463 | 12/2000 |
| WO | WO 01/54040 | 7/2001 |

OTHER PUBLICATIONS

U.S. Appl. No. 09/490,867, published Jan. 21, 2000, Sam E. Kinney, Jr.

U.S. Appl. No. 09/331,556, published May 14, 1999, Harm Drecoll.

U.S. Appl. No. 09/327,600, published May 14, 1999, Kinney et al.

U.S. Appl. No. 09/311,559, published May 14, 1999, Alaia et al.

U.S. Appl. No. 09/311,558, published May 14, 1999, Alaia et al.

U.S. Appl. No. 09/311,557, published May 14, 1999, Alaia et al.

U.S. Appl. No. 09/311,555, published May 14, 1999, Alaia et al.

U.S. Appl. No. 09/282,158, published Mar. 31, 1999, Kinney et al.

U.S. Appl. No. 09/282,157, published Mar. 21, 1999, Kinney et al.

U.S. Appl. No. 09/282,156, published Mar. 31, 1999, Kinney et al.

U.S. Appl. No. 11/982,338, Alaia et al., Office Action May 22, 2009.

U.S. Appl. No. 11/982,388, Alaia et al., Response to Office Action Amendment B Aug. 24, 2009.

U.S. Appl. No. 11/982,388, Alaia et al., Notice of Allowance & Reasons for Allowance.

U.S. Appl. No. 90/008,782, Alaia et al., Order Grating/Denying Request for Ex Parte Reexamination Jan. 16, 2008.

U.S. Appl. No. 90/008,782, Alaia et al., Office Action in Ex Parte Reexamination Jul. 24, 2008.

U.S. Appl. No. 90/008,782, Alaia et al., Ex Parte Reexamination Interview Summary Sep. 23, 2008.

U.S. Appl. No. 90/008,782, Alaia et al., Ex Parte Response Sep. 24, 2008.

U.S. Appl. No. 90/008,782, Alaia et al., Notice of Intent to Issue Ex Parte Reexamination Certificate Feb. 20, 2009.

U.S. Appl. No. 90/008,782, Alaia et al., Written Statement Aug. 16, 2008.

J. Sairamesh et al., "Economic Framework for Pricing and charging in Digital Libraries", D-Lib Magazine, Feb. 1996.

Banatre et al., "The Design and Building of Enchere, a Distributed Electronic Marketing System" Communication of the ACM, No. 1, Jan. 29, 1986.

Danny Cohen, "Computerized Commerce" Information Processing 89, Aug. 28-Sep. 1, 1989.

Malone et al., "The Logic of Electronic Markets" Harvard Business Review, No. 89311, May-Jun. 1989.

Freemarkets Online, "Bidware Manual" Jun. 9, 1988.

Freemarkets Online, "Online Industrial Market Making, An Overview of Purchasing Executives".

WebAuction.com, "How to Play" 1998.

Auction Sales, "Live Auctions Online" Sep. 1998.

Auction Port, "Online Auction Community - New Auctions Since Aug. 2, 1998" Jul. 1998.

OnSale, "How to Play" 1998.

u-Auction-It, 1997.

Freemarkets Online, "Homepage" 1998.

Andrews, "Auctions Catch the Interest of Hobbyist and Big Business" Aug. 24, 1998.

Associated Press, "Auction on Web is Buyer's Market" Apr. 6, 1998.

Steinert-Trelkeld, "New Watchwords: Let the Sells Beware" Jun. 1, 1998.

Woolley, "E-muscle" Mar. 9, 1998.

Associated Press, "FreeMarkets Takes Auction on Internet" Feb. 23, 1998.

Jahnke, "How Bazaar" Aug. 27, 1998.

Wilder, "What's Your Bid? —FreeMarket's real-time online bidding technology lets client drive down costs and improve product value" Nov. 10, 1997, Information Week.

"Online bidding software", Electronic Buyers' News, Aug. 25, 1997 Issue 1072, p. 86, 1/6p.

"FairMarket Launches New Self-Serve Auctions.", Business Wire, p. 6161495, Jun. 16, 1998.

Broadvision Developing First interactive Commerce Management System to Support Online Sales & Marketing Process . . . , Business!

Ho Geun Lee, "Do electronic marketplaces lower the price of goods?" Communications of the PCM, v41n1 pp. 73-80 Jan. 1998.

"Sold! . . . To the Lowers Bidder", Computer Finance, v6, n2 Jul. 1995.

"Venture Capitalists Fund Two Massachusetts Internet Related Companies", Boston Globe, Jan. 14, 1998.

Von Det Fehr et al., "Predatory bidding in sequential auctions" Oxford Economics Papers, v46, n3, p. 345(12), Jul. 1994.

"Moai Technologies Introduced New categories of Business to Business Auction Software . . . " Business Editors and Computer writes, Mar. 16, 1998.

Kikuchi et al., "Multi-Round Anonymous Auction Protocols," IEICE Trans. Ing. & Syst., Vol. E82-D, No. 4, Apr. 1999.

Vigoroso, "buyers prepare for brave new World of E-Commerce," Purchasing, vol. 126, No. 6, p. S4(1), Apr. 22, 1999.

FCC Auction, Procedures, Terms and Conditions retrieved from <http://wireless.fcc.gov/actions/17/releases/lmdsbp_p.pdf> Dec. 1997.

M. Reck, "Types of Electronic Auctions" Hochschule St. Gallen.

C. Wrigley, "Design Criteria for Electronic Market Servers" Electronic Markets, vol. 7, No. 4, 1997.

"Shawmut Nation Will Auction $46 Million in Commercial Real Estate in December" Business Wire, Business Editor, Nov. 3, 1992.

Wurman et al., "The Michigan Internet AuctionBot: A Configurable Auction Server for Human and Software Agents," Artificial Intelligence Laboratory, University of Michigan, 1998.

Buyer's Auction Online, http://buyersauction.com/userinfo.htm, 1998.

Keith Ervin, "Three Tree Point Property Draws 1.5 Million Bid," Seattle Times, Feb. 11, 1998.

Fox, "The Calm Way of Buying and Selling Livestock," Sydney Morning Herald, Oct. 10, 1988.

"What You Need to Know of Bid in FCC;s Narrowband Auction," Washington Telecom News, Jun. 27, 1994.

Rockoff et al., "Deisgn of an Internet-Based System for Remote Dutch Auctions," Internet Research: electronic Networkign Application and Policy, vol. 5 - No. 4, pp. 10-16, 1995.

"Shoppersuniverse", Aug. 27, 1996.

Jackson," FCC Charges for Online Bidding," Government Computer News, Jan. 27, 1997.

"Ingram Micro Launches Real-Time On-Line Auction Site," PR Newswire, Feb. 11, 1998.

"Adauctions.com Boosts Revenue with Enhanced Ad *Auction* Format; Morning and Afternoon *Auctions* and "AutoExtend" Feature Maximize Opportunistic Media Buying on the Web," Business Wire, May 4, 1998.

Woods, "Excite Calls Online Auctions," Newsbytes News Network, Jun. 10, 1998.

"Internet: Excite Going Once, Twice, Three Times to Auctions," Network Briefing, Jun. 11, 1998.

Kumar et al., "Internet Auctions," Third Usenix Workshop on Electronic Commerce Proceedings, p. 49, Aug. 31-Sep. 3, 1998.

"Plaintiffs Original Complaint" in *Ariba, Inc.* v. *Emptoris, Inc.*, Civil Action No. 9:07-CV-90-RC, in the Eastern District of Texas.

"Defendant's Answer and Jury Demand" in *Ariba, Inc.* v. *Emptoris, Inc.*, Civil Action No. 9:07-CV-90-RC, in the Eastern District of Texas.

"Defendant's First Amended Answer, Counterclaims, and Jury Demand" in *Ariba, Inc.* v. *Emptoris, Inc.*, Civil Action No. 9:07-CV-90-RC, in the Eastern District of Texas.

"Joint Claim Construction and Pre-Hearing Statement" in *Ariba, Inc.* v. *Emptoris, Inc.*, Civil Action No. 9:07-CV-90-RC, in the Eastern District of Texas.

"Defendant's Markman Technology Synopsis" in *Ariba, Inc.* v. *Emptoris, Inc.*, Civil Action No. 9:07-CV-90-RC, in the Eastern District of Texas.

"Plaintiff s Opening Claim Construction Brief" in *Ariba, Inc.* v. *Emptoris, Inc.*, Civil Action No. 9:07-CV-90-RC, in the Eastern District of Texas.

"Joint Appendix of Plaintiff Ariba, Inc. and Emptoris, Inc. in Support of the Parties' Claim Construction Briefing" in *Ariba, Inc.* v. *Emptoris, Inc.*, Civil Action No. 9:07-CV-90-RC, in the Eastern District of Texas.

"Defendant's Markman Brief" in *Ariba, Inc.* v. *Emptoris, Inc.*, Civil Action No. 9:07-CV-90-RC, in the Eastern District of Texas.

"Plaintiffs Reply in Support of It's Opening Claim Construction Brief" in *Ariba, Inc.* v. *Emmons, Inc.*, Civil Action No. 9:07-CV-90-RC, in the Eastern District of Texas.

"Parties' P.R. 4-5(d) Joint Claim Construction Chart" in *Ariba, Inc.* v. *Emptoris, Inc.*, Civil Action No. 9:07-CV-90-RC, in the Eastern District of Texas.

"Parties' Revised P.R. 4-5(d) Joint Claim Construction Chart" in *Ariba, Inc. v. Emptoris, Inc.*, Civil Action No. 9:07-CV-90-RC, in the Eastern District of Texas.

"Minute Entry for Proceedings Held Before Judge Ron Clark" in *Ariba, Inc. v. Emptoris, Inc.*, Civil Action No. 9:07-CV-90-RC, in the Eastern District of Texas.

"Plaintiffs' Supplemental Claim Construction Citations" in *Ariba, Inc. v. Emptoris, Inc.*, Civil Action No. 9:07-CV-90-RC, in the Eastern District of Texas.

"Order on Agreed Claim Terms" in *Ariba, Inc. v. Emptoris, Inc.*, Civil Action No. 9:07-CV-90-RC, in the Eastern District of Texas.

"Joint Final Pre-Trial Order" in *Ariba, Inc. v. Emptoris, Inc.*, Civil Action No. 9:07-CV-90-RC, in the Eastern District of Texas.

"Defendants' Response to Plaintiffs' Notice of Intent to Offer Representative Claims at Trial" in *Ariba, Inc. v. Emptoris, Inc.*, Civil Action No. 9:07-CV-90-RC, in the Eastern District of Texas.

"Stipulation of Dismissal of Claims Related to U.S. Patent 6,408,283" in *Ariba, Inc. v. Emptoris, Inc.*, Civil Action No. 9:07-CV-90-RC, in the Eastern District of Texas.

"Order that the Parties' Stipulation of Dismissal of Claims Related to U.S. Patent 6,408,283 is Granted" in *Ariba, Inc. v. Emptoris, Inc.*, Civil Action No. 9:07-CV-90-RC, in the Eastern District of Texas.

Board of Supervisors of the Count of Kern; *Kern County Ordinance No. G-6284*;Kern County, CA; Apr. 1996.

Business Wire; *eBay's Auction Web Tops One Million Bids; Leading Online Auction Service Announces Record Year*; Dec. 12, 1996.

Ralph Cassady Jr.; *Auctions and Auctioneering*; University of California Press; pp. 227-237; 1967.

Roger Clarke & Michael Jenkins; *Case Study: The Strategic Intent of On-Line Trading Systems: A Case Study in National Livestock Marketing*; Journal of Strategic Information Systems, vol. 2, No. 1 Butterworth-Heinemann Ltd.; Mar. 1993.

Danny Cohen; *Computerized Commerce*; Information Processing 89, Elsevier Science Publishers BV; 1989.

Peter Cramton; *Money Out of Thin Air: The Nationwide Narrowband PCS Auction*; Journal of Economics & Management Strategy, vol. 4, No. 2, 267-343, 1995.

Douglas Dyer & John H. Kagel; *Bidding in Common Value Auctions: How the Commercial Construction Industry Corrects for the Winner's Curse*; Journal of Institute for Operations Research and the Management Sciences vol. 42, No. 10; Oct. 1996.

FCC; *In the Matter of Implementation of Section 309(i) of the Communications Act-Competitive Bidding PP Docket No. 93-253 Release-Number: Federal Communications Commission 94-61 Second Report and Order*; FCC; pp. 1-2, 19-35, 50-61; May 12, 1994.

FCC; *In the Matter of Revision of Rules and Policies for the Direct Broadcast Satellite Service Report and Order FCC 95-507*; FCC; pp. 9779-9805; Dec. 14, 1995.

FCC; *FCC Auction Interactive Video and Data Service Selected Metropolitan Statistical Area Licenses and Rural Service Area Licenses Frequency Blocks A & B Bidder Information Package*; FCC; pp. 1-3, 85-95; Feb. 18, 1997.

FCC; *Federal Communications Commission Order, Memorandum Opinion and Order and Notice of Proposed Rule Making FCC 97-60*; FCC; pp. 1-44; Feb. 28, 1997.

FCC Wireless Telecommunications Bureau; *The FCC Report to Congress on Spectrum Auctions*; FCC; pp. 1-28-; Oct. 9, 1997.

FCC; *Welcome to the FCC Auctions Remote Access System*; Index of /PCS/Broadband/BTA/Auction_10/Programs/, at http://Auctionresults1.fcc.gov/PCS/Broadband/BTS/Auction_10/Programs/[E_118254]; Oct. 21, 1997.

FCC; *Readme File for Bid Tracking Software: BTA Track.xls*; http://wireless.fcc.gov/auctions/05/releases/README5.TXT; Jan.18, 1996.

FCC; *FCC Auction Local Multipoint Distribution Services ("LMDS") Basic Trading Area Licenses Dec. 10. 1997 Bidder Information Package*; FCC; pp. 11, 103-110; Dec. 10, 1997.

Thomas W. Gerdel; *Bidding on Internet GE Lighting Puts Specifications in Cyberspace for Parts Suppliers*; Cleveland Plain Dealer; Jan. 16, 1996.

C. Hugh Hildesley; *The Complete Guide to Buying and Selling at Auction*; W.W. Norton & Company, Inc.; pp. 182-190; Aug. 18, 1997.

Joyce Jones; *Washington Report: Leveling the Field—Ten Percent Price Credit Offered to Minority Firms by President Clinton's New Rules*; Black Enterprise; Oct. 1998.

Vijay Krishna; *Auction Theory*; Academic Press; Chapter 5, including pp. 71-73; Nov. 1986.

Richard Luton & R. Preston Mcafee; *Sequential Procurement Auctions*; Journal of Public Economics vol. 31, No. 2; pp. 181-195; Nov. 1986.

R. Preston Mcafee & John McMillan; *Auctions and Bidding*; Journal of Economic Literature; vol. 25, No. 2; pp. 699-738; Jun. 1987.

R. Preston Mcafee & John McMillan; *Government Procurement and International Trade*; Journal of International Economics vol. 26; pp. 291-308; 1989.

R. Preston Mcafee & John McMillan; *Incentives in Government Contracting*; Ontario Economic Council Research Studies, University of Toronto Press; pp. 121-135; 1988.

John Mcmillan; *Selling Spectrum Rights*; Journal of Economic Perspectives, Vol. 8, No. 3; Apr. 5, 1994.

Roger B. Myerson; *Optimal Auction Design*; Mathematics of Operations Research, Vol. 6, No. 1; Feb. 1981.

Paul Milgrom; *Auction Theory for Privatization Chapter 1: Auctioning the Radio Spectrum*; Cambridge University Press; Sep. 1995.

Charles R. Plott; *Laboratory Experimental Testbeds: Application to the PCS Auction*; Division of Humanities and Social Sciences, California Institute of Technology; May 1996.

J. Sairamesh, C. Nikolaou, D.F. Ferguson & Y. Yemini; *Economic Framework for Pricing and Charging Digital Libraries*; D. Lib Magazine; Feb. 1996.

Robert Wilson; *Appendix III: Submittals of the California Independent System Operator Corporation and California Power Exchange Corporation Report to the California Trust for Power Industry Restructuring Activity Rules for the Power Exchange Phase 3: Experimental Testing*; Federal Energy Regulatory Commission; pp. 1, 43-62, Appendix III, Attachment 1; Mar. 3, 1997.

Robert Wilson; *Report to the California Trust for Power Industry Restructuring Activity Rule for the Power Exchange*; Federal Energy Regulatory Commission; pp. 1, PX Appendix 3 pp. 1-14; Mar. 14, 1997.

*Electronic Commerce Opening New Opportunities*; Electronic Commerce Resource Center; 1995.

David Prizinsky; *Going . . . going . . . paper bids to be gone?*; Crain's Cleveland Business Sep. 14, 1994.

David Prizinsky; *GE Bid System Met With Caution*; Crain's Cleveland Business Mar. 13, 1995.

Zaretsky et al., "Going Once, Going Twice, Sold: Auctions and the Success of Economic Theory," Regional Economist, pp. 1-5.

FCC Auction "Bidder Information Package Local Multipoint Distribution Service ("Lmds")" Basic Trading Area Licenses, Dec. 10, 1997, pp. 1-370.

Charles River Associates Inc. And Market Design, Inc., "Report 1A: Auction Design Enhancements for Non-Combinatorial Auctions;" CRA No. 1351-00, Sep. 1997, pp. 1-18.

FCC Auction, "Bidder Information Package, Broadband Personal Communication Services (PCS: Basic Trading Area License Frequency Block D & E and Entrepreneurs" Frequency Block F, Aug. 26, 1996, pp. 1-234.

Porter et al., "Detection of Bid Rigging in Procurement Auctions," Journal of Political Economy, 1993, pp. 518-538, vol. 101, No. 3.

In the Matter of Amendment of Part 1 of the Commission's Rules—competitive Bidding Proceeding; Order, Memorandum Opinion and Order and Notice of Proposed Rule Making, FCC, WT Docket No. 97-82, Feb. 20, 1997, pp. 1-66.

\* cited by examiner

SYSTEM FLOW

| | COORDINATOR | BUYER | SUPPLIER |
|---|---|---|---|
| INITIAL CONTACT 102 | CONTACT BUYER | PROVIDE DATA | |
| RFQ 104 | COLLECT & ADMINISTER RFQ DATA | PROVIDE RFQ DATA | |
| | PUBLISH & ADMINISTER RFQ | | ACCESS RFQ |
| | MANAGE RFQ RESPONSE | | RESPOND TO RFQ |
| AUCTION ADMINISTRATION 106 | | REQUEST AUCTION | |
| | COORDINATE & ADMINISTER AUCTION SETUP | | |
| | ASSIST & ADMINISTER USER AUCTION PREP | | PREPARE FOR AUCTION |
| CONDUCT AUCTION 108 | ASSIST & ADMINISTER AUCTION | OBSERVE | BID |
| ADMINISTER AUCTION RESULTS 110 | ANALYZE & ADMINISTER CBE RESULTS | VIEW AUCTION RESULTS | VIEW AUCTION RESULTS |
| CONTRACT ADMINISTRATION 112 | | SETTLEMENT | SETTLEMENT |

*FIG. 2*

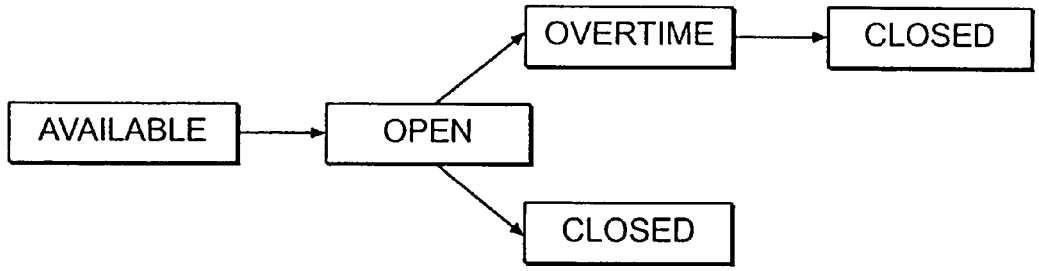

FIG. 5

```
                              CURRENT TIME:    10:00:11 AM
LOT   NAME                CLOSING TIME  STATUS    MARKET BID
01    PP - GAS ASSIST      10:30:00 AM   OPEN              0
02    ABS/PC/ACETAL        10:45:00 AM   OPEN              0
03    ACETAL/PA/PS         11:00:00 AM   OPEN              0
04    PA/PVC/TPE/EVA       11:15:00 AM   OPEN              0
05    PP                   11:30:00 AM   OPEN              0
06    PPO/PC/PVC/PS/ACETAL 11:45:00 AM   OPEN              0
07    PC - ARCH            12:00:00 AM   OPEN              0
08    PPO/PP - ARCH.       12:15:00 PM   OPEN              0
```

FIG. 6A

```
                              CURRENT TIME:    10:27:00 AM
LOT   NAME                CLOSING TIME  STATUS    MARKET BID
01    PP - GAS ASSIST      10:30:00 AM   OPEN        374,586
02    ABS/PC/ACETAL        10:45:00 AM   OPEN        160,159
03    ACETAL/PA/PS         11:00:00 AM   OPEN        344,481
04    PA/PVC/TPE/EVA       11:15:00 AM   OPEN        664,817
05    PP                   11:30:00 AM   OPEN      1,015,953
06    PPO/PC/PVC/PS/ACETAL 11:45:00 AM   OPEN      3,940,244
07    PC - ARCH            12:00:00 AM   OPEN         64,888
08    PPO/PP - ARCH.       12:15:00 PM   OPEN         20,325
```

FIG. 6B

|     |                      | CURRENT TIME: | 10:30:26 AM |           |
|-----|----------------------|---------------|-------------|-----------|
| LOT | NAME                 | CLOSING TIME  | STATUS      | MARKET BID |
| 01  | PP - GAS ASSIST      | 10:32:00 AM   | OVERTIME    | 372,500   |
| 02  | ABS/PC/ACETAL        | 10:45:00 AM   | OPEN        | 160,000   |
| 03  | ACETAL/PA/PS         | 11:00:00 AM   | OPEN        | 344,481   |
| 04  | PA/PVC/TPE/EVA       | 11:15:00 AM   | OPEN        | 652,346   |
| 05  | PP                   | 11:30:00 AM   | OPEN        | 999,745   |
| 06  | PPO/PC/PVC/PS/ACETAL | 11:45:00 AM   | OPEN        | 3,940,244 |
| 07  | PC - ARCH            | 12:00:00 AM   | OPEN        | 64,888    |
| 08  | PPO/PP - ARCH.       | 12:15:00 PM   | OPEN        | 20,325    |

*FIG. 6C*

|     |                      | CURRENT TIME: | 10:32:05 AM |           |
|-----|----------------------|---------------|-------------|-----------|
| LOT | NAME                 | CLOSING TIME  | STATUS      | MARKET BID |
| 01  | PP - GAS ASSIST      | 10:32:00 AM   | CLOSED      | 371,373   |
| 02  | ABS/PC/ACETAL        | 10:45:00 AM   | OPEN        | 148,027   |
| 03  | ACETAL/PA/PS         | 11:00:00 AM   | OPEN        | 344,481   |
| 04  | PA/PVC/TPE/EVA       | 11:15:00 AM   | OPEN        | 652,346   |
| 05  | PP                   | 11:30:00 AM   | OPEN        | 999,745   |
| 06  | PPO/PC/PVC/PS/ACETAL | 11:45:00 AM   | OPEN        | 3,940,244 |
| 07  | PC - ARCH            | 12:00:00 AM   | OPEN        | 64,888    |
| 08  | PPO/PP - ARCH.       | 12:15:00 PM   | OPEN        | 20,325    |

*FIG. 6D*

| BID | BID TIME | MARKET STATUS BEFORE BID | MARKET STATUS AFTER BID | LOT 01 CLOSING TIME BEFORE BID | LOT 01 CLOSING TIME AFTER BID |
|---|---|---|---|---|---|
| A | 10:26:49 | OPEN | OPEN | 10:30:00 | 10:30:00 |
| B | 10:29:06 | OPEN | OVERTIME | 10:30:00 | 10:31:00 |
| C | 10:30:33 | OVERTIME | OVERTIME | 10:31:00 | 10:32:00 |
| D | 10:30:45 | OVERTIME | OVERTIME | 10:32:00 | 10:32:00 |
| E | 10:31:45 | OVERTIME | OVERTIME | 10:32:00 | 10:32:00 |
|   |   |   |   |   |   |

| BID HISTORY FOR LOT 1 | | | | |
|---|---|---|---|---|
| EVENT | BIDDER | BID TIME | BID AMOUNT | CURRENT BEST BID |
|  | BIDDER 13 | 10:00:19 | 392,118 | 392,118 |
|  | BIDDER 15 | 10:00:36 | 396,252 | 392,118 |
|  | BIDDER 6 | 10:01:54 | 450,012 | 392,118 |
|  | BIDDER 3 | 10:02:46 | 391,556 | 391,556 |
|  | BIDDER 13 | 10:03:50 | 390,142 | 390,142 |
|  | BIDDER 18 | 10:04:59 | 388,086 | 388,086 |
|  | BIDDER 22 | 10:06:09 | 400,156 | 388,086 |
|  | BIDDER 3 | 10:06:44 | 388,703 | 388,086 |
|  | BIDDER 3 | 10:08:58 | 387,489 | 387,489 |
|  | BIDDER 7 | 10:10:02 | 378,615 | 378,615 |
|  | BIDDER 3 | 10:12:55 | 385,089 | 378,615 |
|  | BIDDER 13 | 10:20:22 | 375,144 | 375,144 |
|  | BIDDER 7 | 10:22:49 | 377,124 | 375,144 |
|  | BIDDER 18 | 10:24:37 | 374,586 | 374,586 |
| A | BIDDER 7 | 10:26:49 | 376,334 | 374,586 |
| B | BIDDER 15 | 10:29:06 | 373,063 | 373,063 |
| C | BIDDER 7 | 10:30:03 | 372,500 | 372,500 |
| D | BIDDER 13 | 10:30:45 | 371,373 | 371,373 |
| E | BIDDER 7 | 10:31:45 | 374,142 | 371,373 |

*FIG. 8*

| BIDWARE: BID CONFIRMATION ||
|---|---|
| YOU ARE IN THE PROCESS OF SUBMITTING THE FOLLOWING BID: ||
| LOT NUMBER: | 1 |
| LOT NAME: | PLASTIC PARTS |
| LOT BID AMOUNT | $1,801,048 |
|  ||
| CONFIRM | CANCEL |

*FIG. 15A*

| BIDWARE: WARNING |
|---|
| THIS BID YOU ARE ABOUT TO SUBMIT IS MORE THAN 20% BELOW YOUR PREVIOUS BID. YOU MUST RESUBMIT YOUR BID. |
| OK |

*FIG. 15B*

| BIDWARE: WARNING ||
|---|---|
| THIS BID YOU ARE ABOUT TO SUBMIT IS MORE THAN 10% BELOW THE CURRENT MARKET LEADING BID. DO YOU STILL WISH TO PROCEED? ||
| LOT NUMBER: | 1 |
| LOT NAME: | PLASTIC PARTS |
| LOT BID AMOUNT | $1,801,048 |
|  ||
| CONFIRM | CANCEL |

*FIG. 15C*

METHOD AND SYSTEM FOR CONTROLLING THE INITIATION AND DURATION OF OVERTIME INTERVAL IN ELECTRONIC AUCTIONS

CROSS REFERENCE TO OTHER APPLICATIONS

This application is a continuation of application Ser. No. 09/828,731, filed Apr. 9, 2001 now U.S. Pat. No. 7,283,980, which is a continuation of U.S. application Ser. No. 09/311,557, now U.S. Pat. No. 6,216,114, filed May 14, 1999, which is a divisional of U.S. application Ser. No. 09/252,790, now U.S. Pat. No. 6,230,146, filed Feb. 19, 1999, which claims priority to U.S. Provisional Application No. 60/101,141, filed Sep. 18, 1998, and U.S. Provisional Application No. 60/110,846, filed Dec. 4, 1998, all of which are hereby incorporated by reference.

BACKGROUND OF THE INVENTION

The disclosed inventions relate generally to conducting electronic auctions, and in particular to business-to-business bidding auctions for industrial purchasers.

Traditional Procurement Models

Procurement of supplies has traditionally involved high transaction costs, especially information search costs. The introduction of electronic commerce has introduced new methods of procurement that lower some of the transaction costs associated with procurement. Online procurement, or business-to-business electronic commerce, matches buyers and suppliers so that transactions can take place electronically. There are three models for online procurement: catalog, buyer-bidding auction, and seller-bidding auction.

The "catalog" model of online procurement was the first to be developed. The first electronic catalogs were developed by suppliers to help customers obtain information about products and order supplies electronically. These first electronic catalogs were single-source; i.e. they only allowed customers to obtain information and products from that supplier.

However, customers were not satisfied with being "locked in" to one supplier—they wanted to be able to compare a number of competing products to be sure of getting the product features they wanted, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services has compiled a database that lists all airplane parts suppliers that have a certain item in stock. Buyers dial into the database to get information on the parts they need. Here, it is a third party, Inventory Locator Service, not a supplier, creating the unbiased electronic market.

The electronic catalog model of electronic commerce involves one buyer and one seller at a time. When many buyers compete for the right to buy from one seller, a buyer-bidding auction model is created. A noteworthy example of the buyer-bidding auction model is that operated by PriceLine.com and described in U.S. Pat. No. 5,794,207 issued to Walker et al. In this system, potential buyers compete for airline tickets by submitting a bid for an airline ticket on the PriceLine website, and airlines can choose to accept a bid, thereby committing the buyer to buy the ticket.

The catalog and buyer-bidding auction types of electronic markets do not work in some situations however. If the required product is custom, it is not possible for suppliers to publish a set price for a catalog market. Likewise, it is not possible for buyers to identify the product they want to bid on in a buyer-bidding auction. There are fewer suppliers and no standard product and pricing information available for the buyer of custom industrial products. Traditionally, when a company requires a custom industrial product, procurement is made by a buyer for the company who searches for a supplier and acquires price quotes from a potential supplier for the needed custom product. The search is slow and somewhat random because it usually relies heavily on personal relationships. The costs associated with locating vendors, comparing their products, negotiating, and paperwork are a big factor in the make-or-buy decision. The cost of switching suppliers is very large, which means that the quoted price is probably not the lowest fair price and that it is hard for a new supplier to enter the market.

Therefore, buyers wanted to use auctions to save money. The assignee of the present application developed a system wherein sellers downwardly bid against one another to achieve the lowest market price in a supplier-bidding auction.

Supplier-Bidding Auction

In a supplier-bidding auction, bid prices start high and move downward in reverse-auction format as bidders interact to establish a closing price. The auction marketplace is one-sided, i.e. one buyer and many potential suppliers. Typically, the products being purchased are components or materials. "Components" typically mean fabricated tangible pieces or parts that become part of assemblies of durable products. Example components include gears, bearings, appliance shelves or door handles. "Materials" typically mean bulk quantities of raw materials that are further transformed into product. Example materials include corn syrup or sheet steel.

Industrial buyers do not typically purchase one component at a time. Rather, they purchase whole families of similar components. At times, components are strongly related to one another. As an example, a buyer might purchase a given plastic knob in two different colors, or might purchase a nameplate in four different languages. These parts are so similar that by definition they must be purchased from the same supplier—all of the knobs are made using the same mold. These items are therefore grouped into a single lot. Bidders in industrial auctions must provide unit price quotes for all line items in a lot.

Auction Process

The process for a supplier-bidding auction as conducted by the assignee of the present application is described below with reference to FIGS. 1 and 2. FIG. 1 illustrates the functional elements and entities in an supplier-bidding auction, while FIG. 2 is a process diagram that identifies the tasks performed by each of the involved entities.

The supplier-bidding auction model requires that the bidding product or service be defined by the buyer (identified as Buyer 10 in FIG. 1). An auction coordinator (Coordinator 20 in FIG. 1) works with buyers to prepare for and conduct an auction and to define the potentially new supply relationships resulting from the auction.

As shown in FIG. 2, in the Initial Contact phase 102 of the auction process, the coordinator contacts the buyer, and the buyer provides data to the coordinator. The coordinator prepares a specification 50 for each desired product or part 52. Once the product 52 is defined, potential suppliers for the product are identified. The coordinator 20 and buyer 10 work together to compile this list of potential suppliers from suppliers already known to the buyer as well as suppliers recommended by the coordinator.

The buyer makes a decision regarding which potential suppliers will receive invitations to the upcoming Auction. Suppliers that accept Auction invitations are then sent notices regarding the upcoming Auction, as well as client software to install in preparation of participating the Auction.

In the RFQ phase 104, coordinator 20 works with the buyer 10 to prepare a Request for Quotation ("RFQ") 54. The coordinator collects and maintains the RFQ data provided by buyer 10, and then publishes the RFQ, and manages the published RFQ. The RFQ includes specifications 50 for all of the parts 52 covered by the RFQ. In the RFQ 54, buyer 10 aggregates similar part or commodity line items into job "lots." These lots allow suppliers 30 to bid on that portion of the business for which they are best suited.

During the auction 56, bids 58 will be taken against individual lots (and their constituent parts 52) within RFQ 54. While bidders must submit actual unit prices for all line items, the competition in an Auction is based on the aggregate value bid for lots. The aggregate value bid for a lot depends upon the level and mix of line item bids and the quantity for each line item. Therefore, bidders submit bids at the line item level, but compete on the lot level.

In the Auction Administration phase 106, coordinator 20 coordinates the Auction and administers the Auction setup and preparation. The coordinator sends a RFQ to each participating supplier, and assists participating suppliers with preparation for the Auction.

In the Auction phase 108, suppliers 30 submit bids 58 on the lots and monitor the progress of the bidding by the participating suppliers 30. The coordinator assists, observes, and administers the Auction.

When the bidding period is over, the auction enters the Auction Results Administration phase 110. In this phase, coordinator 20 analyzes and administers the Auction results, which are viewed by buyer 10. The buyer begins to conduct final qualification of the low bidding supplier(s). The buyer may retain the right not to award business to a low bidding supplier based on final qualification results or other business concerns.

In the ensuing Contract Administration phase 112, the coordinator facilitates settlements 62 awarded by the buyer 10 to suppliers 30. Contracts 52 are then drawn up between buyer 10 and suppliers 30.

Communications and Software

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider 40 accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. The client component is used by suppliers 30 to make bids during the Auction. The bids are sent via the network service provider 40 to the site of the coordinator, where it is received by the server component 23 of the software application. The client component includes software used to make a connection through telephone lines or the Internet to the server component. Bids are submitted over this connection and updates are sent to connected bidders.

Bids can only be submitted using the client component of the application—this ensures that buyers do not circumvent the bidding process, and that only invited suppliers participate in the bidding. Typically, bidders can see their bids and bids placed by other suppliers for each lot on the client component. When a bidder submits a bid, that bid is sent to the server component and evaluated to determine whether the bid is from an authorized bidder, and whether the bid has exceeded a predetermined maximum acceptable price. Bids placed by a supplier are broadcast to all connected bidders thereby enabling every participating bidder to see quickly the change in market conditions and begin planning their competitive responses.

Conduct of an Auction

The conduct of an Auction will now be described in conjunction with the operation of the software application. The Auction is conducted on a specified date, and commences at a specified time. Bidding on each of the lots of products involved is scheduled to begin simultaneously at the start time for the Auction. Each lot is assigned a scheduled closing time after which further bids by potential suppliers submitted via the client application will not be accepted by the server application. The closing times for the lots are staggered so that they are not coterminous.

Associated with each lot at any given time in the progress of the Auction is a bidding status. The possible bidding statuses are illustrated in FIG. 5. The status initially assigned to each lot, before the scheduled start time of the Auction, is "Available." This status indicates that the lot will be available for bidding in the Auction. In the normal sequence of an Auction, the next bidding status is "Open," which indicates that the Auction is underway and that bids can be submitted for the lot. There are two possible bidding statuses to which a lot with an "Open" status can change: "Overtime" and "Closed." Overtime indicates an extension of time to allow bidding to continue after the scheduled closing time for bidding on the lot. If bidding is still active at the end of a first Overtime period of predetermined duration, the server application allows a second Overtime, and so on, until bidding has closed. "Closed" indicates that the server application will no longer accept bids on the lot. A lot's status changes from Overtime only to Closed.

Information regarding the Auction that can be displayed by the client application is illustrated in FIGS. 6A-6D at selected times during the conduct of an Auction. FIG. 6A illustrates lot information provided at the start of an Auction. The lot closing times are shown for each of the lots (01-08) as 10:30:00 AM, etc. The lots are identified by name (e.g. "PP-Gas assist" which stands for "Gas Assist Polypropylene Parts" for lot 01). The indicated status for each lot is "OPEN." The "Market Bid" column indicates the current lowest or best bid for the lot. The current time (10:00:11 AM) is shown in the upper right corner of the display.

The presented information changes during the course of bidding. For purposes of illustration in this example, a series of bids for lot 01 is shown in FIG. 8. Selected bids are identified by an "Event" code (A, B, etc.) in the first column. The bidder's identity is shown in the second column. The time at which the bid was submitted and the amount of the bid are shown in the third and fourth columns. Finally, the best bid in existence at the time of each subsequent bid is shown in the last column.

The changes in status of lot 01 are also illustrated in FIG. 7 for selected times and corresponding bidding events during the Auction. FIG. 7A shows a time line for lot 01, with the bid event letters corresponding to the bids in FIG. 8.

This Auction employs a decision rule to trigger overtime that can be stated: "when a low bid is submitted during a first time interval t before the scheduled close, reschedule the close to occur later by one time interval t." Thus, for a time interval t of one minute, a scheduled closing time of 10:30 is extended to 10:31 if overtime is triggered.

In this example, Bid A is received at 10:26:49. This bid has no effect on the status or on the scheduled closing time of lot 01, because it does not arrive within one minute of the scheduled closing time of 10:30.

When bid B is received, the status of lot 01 immediately changes to Overtime, because bid B is a low bid and is received at 10:29:06, within one minute of 10:30. The scheduled closing time is therefore delayed until 10:31, which is one increment t (one minute) after the original closing time of 10:30. This additional increment is available for bidders to consider whether to submit a bid in response to bid B.

When bid C is received, the status of the lot remains overtime, but because it was a new low bid and was received at 10:30:03, within one increment t of the then-scheduled closing time of 10:31, the scheduled closing time is further delayed by one increment t to 10:32.

When bid D is received at 10:30:45, there is no effect on the status of the scheduled closing time, because although the bid is a new low bid ($371,373) it is not received within one minute of the then-scheduled closing time of 10:32.

Although Bid E is received within one minute of the scheduled closing time of 10:32, it is not a new low bid (i.e. is greater than 371,373) and therefore no additional time is added. Lot 01 therefore closes at 10:32.

FIG. 6B shows the status of the Auction at 10:27. Lot 01 is shown as "Open," with a current Market Bid (best current bid) of $374,586. This reflects the status after bidding several bids have been received. FIG. 6C illustrates the status of the Auction at 10:30 AM, after bids B and C. In bid B, Bidder 5 submitted another best bid ($373,063), which initiated a one-minute overtime period, extending the closing time for lot 1 to 10:31. In bid C, Bidder7 submitted another best bid ($372,500), which initiated another one-minute overtime period, extending the closing time for lot 1 to 10:32. Bid D, submitted at 10:30:45 was another best bid ($371,373), but was not submitted within one minute of the 10:32 closing time. Bid E, although submitted at 10:31:45, within one minute of closing, was not a new low bid and therefore did not extend the closing time for Lot 1. Lot 1 therefore closed at 10:32, with a Market Bid of $371,373, as shown in FIG. 6D (which shows the status of the Auction at 10:32:05).

Bidding Dynamics

Suppliers prepare their price quotes in light of a number of factors. These factors include raw material prices, the design of existing dies or fixtures, the dimensional tolerance required of the component, the amount of engineering support the purchaser desires, the speed with which this particular buyer pays invoices, and the distance the product must be shipped.

Supplier-specific factors also affect the price quotes. Capacity availability, desirability of this particular buyer as a customer, desired levels of profit, and desire to diversify into other markets can all affect the price the seller is willing to accept to supply the needed product. Market-specific factors that are not predictable during the preparation of quotations but that are evident during the auction can also be important in determining, for example, how aggressively other participants may bid.

Because business-to-business auctions are conducted for important custom components, low bidders may still be "passed over" if other bidders demonstrate non-price advantages.

Sometimes auctions involve parts that this purchaser has procured before, and are possibly being made currently by one or more suppliers. These would be termed "existing parts." When a part is currently being made by a supplier, that supplier would be termed the "incumbent supplier." In an auction situation, the incumbent supplier is placed in a position of having to defend its contract with the purchaser.

Incumbent suppliers are expected to behave differently than outsiders. An incumbent, for example, knows that the buyer's switching costs favor the incumbent even at a price premium to the market. Because the buyer may pass over low bidders incumbent suppliers can take advantage of their incumbent status.

Certain human factors must also be considered when conducting business-to-business auctions for industrial purchasing. If not considered, these human factors can interfere with achieving desired outcomes. Bidders must be comfortable with the auction software. Bidders often speak English as a second language, or not at all, making it desirable to provide interpreters.

Bidders must often respond to multi-million-dollar decisions in a few seconds. The fast response required creates cognitive limits—a bidder cannot realistically focus on more than one decision at a time. Many bidders are under some sort of emotional stress when participating, due to the change involved. In some cases, incumbent bidders are literally "fighting for their lives" in situations where losing the contract in question literally means losing their business.

Problems with Prior Auction Process

The prior auction process described above has been found to produce suboptimal results for buyers in light of the market dynamics issues identified above in some circumstances. The problems include: a) multiple lot closing time collisions; b) premature lot closings; c) difficult and inflexible bidding constraints due to lot/line item structure; d) possible prejudice to bidders resulting from technical disruptions; and e) possible prejudice to bidders resulting from submission of erroneous bids.

The first problem is collision of closing times for multiple lots. As described above, the initially scheduled closing times for multiple lots are staggered, so that the lots close at different times, with 10-20 minute intervals between lots. This allows suppliers who would like to bid on multiple lots the opportunity to do so, without having to bid on each lot at the same time. By spacing the closing times for each lot, a supplier knows that while bidding on one lot, the next lot in the Auction will not close. This staggered closing is one way to work around cognitive limits—each lot is sequenced so that bidders can pay attention to one lot at a time.

Overtime delays on an early lot can reduce the time interval before the scheduled closing time of a subsequent lot. In fact, overtime delays have at times overrun the scheduled closing time of a subsequent lot. This situation begins to tax cognitive limits, and bidding opportunities on the subsequent lots are often missed. Although this problem might be resolved by spacing market closing times at a substantial distance apart, experience has shown that even this approach would not be sufficient. For example, in one Auction with 2 lots scheduled with 20 minutes between closing times, actual bidding on the first lot continued for 5 hours and 31 minutes after scheduled close.

The second problem is premature closing of bidding on lots. Just as in an in-person auction, bidding activity tends to increase close to the scheduled closing time. Like the "going, going, gone" auction concept, it is possible to achieve a better auction price if the auction is allowed to continue if bids are still being made. As described above, this concept is implemented through the use of "Overtime," by which the closing time of a specific lot is automatically extended based on the flow of bids into the Auction. Overtime prevents bidders from hanging back and submitting last minute bids in an attempt to prevent competitive reaction.

In the prior system, if a valid, low bid is received in a specified time interval before a lot's scheduled closing time, then the closing time is amended (delayed) to give other bidders more time to react to the late-arriving bid. A bid for second place, something an incumbent supplier might be expected to do, would not trigger an overtime. Unlike in-person auctions, industrial auctions need to allow second place bids. Thus, it has been found that this is an overly simplistic model, which may still be cutting off bidding too soon. A low bidder needs a chance to react to a second place bid, but it cannot if that second place bid does not trigger overtime. Therefore, it would desirable to be able to trigger Overtime, or extend Overtime, on the basis of more complex bid scenarios.

It has also been found that it would be preferable to have more flexibility in the operation of overtime. Overtime is currently implemented with fixed offsets between lot closing times, with fixed trigger time frames (the period before scheduled closing or current Overtime ending), and fixed extension periods for Overtime. In industrial markets, bidding events involve commodities of varying complexity and component packages of different sizes. Accordingly, bidders may need more or less overtime to respond to a bid. The amount of overtime may need to be customized for specific bidding events or for individual lots within an Auction to obtain the optimal market dynamic. It is therefore desirable to provide more flexibility in Overtime.

Another difficulty encountered by bidders in the prior system is that bids needed to be made at the line item level. However, the auction takes place at the lot level, where all of the line item quotes are added up to one sum. This dual structure results from the nature of the industrial market. Price quotations may be built from many cost elements that are added up to form price quotes for individual items or groups of items. Some cost elements or items within a market may be negotiable and others may be fixed depending on factors specific to each bidder. For example, a fabricator may not have control of raw material costs. The competition for a lot can thus involve many independent and dependent factors. Bids are placed in real-time and often in rapid successions. This requires bidders to quickly adjust price quotations for an entire lot, even though this lot may be comprised of hundreds of individual items or cost elements. Initial online auctions only allowed line item price adjustments, and it was difficult to fine-tune the mix of bids. A bidder would have to individually adjust line items, while the software calculated new total lot price bids. This was frequently too time-consuming to keep pace with the auction.

With the time constraints on bidding, bidders wanted the ability to be able to rapidly adjust the lot price without specifically changing individual line items. Therefore, "pro rata" bid adjustment was developed. With pro rata bid adjustment, bidders could change the total lot price quote, and the software would apportion pro rata the change across individual line items in the lot. However, a pro rata apportionment may result in individual items being priced at levels that are uneconomic for the bidder. For some items the bidders may wish to set decision rules for adjusting the unit price quotes at the line item level. For example, bidders may wish to lock-in a preset floor or ceiling on particular line items within a low. These decision rules, or "locks" cause the pro rata adjustments to be applied selectively instead of universally.

Another problem that can arise either in regular bidding or in Overtime is addressing technical disruptions. Real-time technical or operational disruptions in the communications network, software or hardware during the course of a bidding event may prevent a bidder from fully participating. Disruptions may arise in the online network or due to the equipment used by an individual bidder.

In addition, market events or imperfections may disrupt bidding activity and require communication with bidders before the auction can continue. For example, in one auction bidding for an auction lot commenced and it became clear that some of the bidders were including tooling costs and some were not. The correct assumption was to exclude tooling costs. In this example, the bidders needed to be contacted and informed of the correction before the auction could proceed with all bidders on an equal footing.

Other external factors may disrupt the operation of the auction or participation by bidders. In another example, a snow storm prevented many bidders from getting to work on time for the opening of the auction. This was not discovered until many bidders failed to commence bidding.

With a business-to-business transaction, it is typically commercially unacceptable for any bidder to be denied full participation. However, where disruptions arise in the course of a bidding event, the bidding activity and positions of other bidders cannot be prejudiced. Accordingly, market closing times may need to be suspended pending the resolution of a disruption experienced by one or more bidders. This is especially true where it is not clear how long it will take to resolve the problems encountered, including whether it will be possible to resolve all problems prior to the close of an auction lot.

Another problem that occurred in the previous system was the submission of erroneous bids. Bidding errors can happen due to the nature of the online auction. The pace or intensity of the bidding activity can exceed cognitive limits of bidders. In an effort to keep up, bidders enter incorrect quote amounts. Bidders are frequently interested in bidding on multiple lots. In the course of monitoring or switching between lots, the bidder erroneously enters a bid intended for Lot A into Lot B.

In the industrial market, the stakes can be quite large, with contracts awarded for millions of dollars and for contracts that can last for several years. Therefore, the economic damage to suppliers that would be incurred by honoring an erroneous bid is substantial.

In an online industrial auction, an incorrect bid can upset the bidding behavior of other bidders creating inequity for all participants in the market. All bidders in the marketplace view market conditions based on bids placed by other bidders, and respond. They do so relying on the implicit assumption that all bids are valid. If one of the bids is made in error, and the other bidders proceed to bid in response, the integrity of the auction is damaged. This can result in sub-optimal results for both buyers and suppliers.

SUMMARY OF THE INVENTION

The problems encountered with the operation of the prior auction system are overcome by the auction system of the invention, which enables flexible dynamic alterations of market closing times, line item decision rules, auction pause, bidder-specific bid limits, and the ability to detect and prevent erroneous bids.

The amount of overtime added each time a relevant new bid is received can be adjusted to suit the complexity and size of the market lots involved in the bidding event. This permits bidders to have more overtime to respond to each new bid if the commodity complexity or market lot size require additional bid calculation time.

The trigger for additional overtime can be flexibly set to include a range of behind-market bidding activity. The type of behind-market activity that would trigger additional overtime includes bids or bidders of a defined rank behind market and bids of a defined absolute or relative (percentage) quantity behind the market. Additional trigger parameters can also be flexibly created to suit particular industrial markets. This ensures that extra overtime is triggered when certain bids upset the market dynamic.

In multi-market, or multi-lot bidding events, where prior market lots run into overtime, the closing times of subsequent market lots are dynamically altered during the course of an event to maintain a minimum time period between market closings. When market closings have been altered to accommodate this market dynamic, the market status is referred to as "Extended." This ensures that markets do not "collide" or run on top of one another when overtime from an earlier market lot continues past the scheduled closing time for a subsequent market lot. Bidders are guaranteed that markets close one at a time, so they are not placed in the position of having to bid for different market lots at the same time.

Once bidding activity has ceased, a lot is placed into "Pending" status prior to closing the lot. The lot closing time can be dynamically altered to meet the time period required to resolve any technical disruptions experienced by bidders. From Pending status, lots can be set to automatically close after a predefined period of time has elapsed with no technical disruptions reported by bidders, or the lot can be manually closed or held in pending status. Following the resolution of a technical disruption a lot can be returned to "Open" status for all participants to allow bidding activity to continue. Pending status will then be used again to dynamically alter lot closing times until all bidders have fully participated with no technical disruptions. This ensures that all bidders may place all bids irrespective of any technical disruptions that occur during the event without prejudicing the positions and bidding activity of other bidders.

"Pause" status ensures that disruptions to an auction can be dealt with equitably without prejudicing existing bidding activity or positions achieved by bidders. Auction Pause allows the auction coordinator to indefinitely "freeze" an auction without disrupting the bids placed before the pause went into effect. The Pause status can be applied to an entire auction (all lots) or to specific lots within an auction. The Pause status can be applied at any time during an auction and will override any other status currently in effect.

In one embodiment, no bidder is able to submit bids while the auction is in Pause status. In an alternate embodiment, bids may continue to be received but would not be entered into the auction. In this embodiment, bids could be held in a queue awaiting entry upon the removal of the Pause status.

Flexible bidder-determined line item decision rules for bidding permits bidders to set specific price decision rules for aspects of individual line items within a lot. For example, price limits for line items can be established at the initial price quote entered for that item or at a floor or ceiling above or below the initial quote. Different decision rules can be set for different items and rules can be set across some or all of the line items within a lot. Decision rules can be set dynamically during the course of the bidding event by the bidder.

Flexible line-item decision rules enable bidders to lock-in a fixed and variable portion of the price quote prior to the bid. Total bids for a lot can then be adjusted rapidly in response to market activity without changing individual line item quotes to uneconomic levels. In addition, bidders have the comfort of setting floors or ceilings on individual or cost component bids. During the bidding event, fixed components can be reevaluated and unlocked if necessary in response to movements in the market beyond original expectations. This bidding flexibility allows bidders to participate in the auction fully, and increases competition.

Bidder-specific bid rules enable an auction coordinator to maximize the competitive nature of an auction. In a downward auction, each bidder is assigned an individual bid ceiling by the buyer. This bid ceiling sets a maximum bid price that can be submitted by a supplier. The bid ceilings are advantageous to the buyer because it prevents a bidder from withholding pre-auction bids from the market.

The ability to detect, prevent and remove erroneous bids ensures that erroneous bids can be dealt with equitably without prejudicing other bidders or interrupting the auction. A confirmation-box is presented to the bidder to confirm the amount of a bid to be entered. All bids must be checked and confirmed before they will be submitted to the auction server. Predefined "failsafe" rules allow the bidder to limit bids to a certain range. If during the course of an auction, the bidder bids outside that range, additional bid confirmations may be required, or the bidder may be prevented entirely from entering bids that fail "failsafe" criteria. The auction coordinator may override or remove erroneous bids from the auction in real-time. Bids can be quickly and efficiently removed before it prejudices the positions of other bidders and prior to lot closing.

BRIEF DESCRIPTION OF THE DRAWINGS

FIG. 2 is a schematic illustration of the tasks performed by the entities involved in an auction process.

FIG. 5 is a schematic illustration of the possible bidding states in the prior auction system.

FIGS. 6A-6D illustrate the information displayed by the client application in the prior auction system at various times during a sample Auction.

FIG. 8 illustrates a series of bids submitted on one of the lots during the Auction illustrated in FIGS. 6A-6D.

FIGS. 15A-15C illustrate error detection warning and confirmation messages.

DETAILED DESCRIPTION

The auction method and system of the invention are described below. Seven aspects of the system and method are described: a) dynamic lot closing extension; b) flexible overtime; c) flexible bidder-determined line item decision rules; d) pending status; e) bidder-specific bid limits; f) auction pause; and g) error detection and prevention.

Dynamic Lot Closing Extension

The problem identified above of multiple lot closing collisions is addressed with the dynamic lot closing extension feature. This feature involves rescheduling, or extending, the closing time of a subsequent lot when the closing time of a preceding lot is extended to the point where it becomes unacceptably close in time to the subsequent lot's then-scheduled closing time. Thus, this feature involves adding a rule to the lot closing determination that can be stated as: "Maintain a minimum time interval between the closing time of one lot and the closing time of the next subsequent lot." This feature is illustrated with reference to FIGS. 9A-9B.

Figure 9:
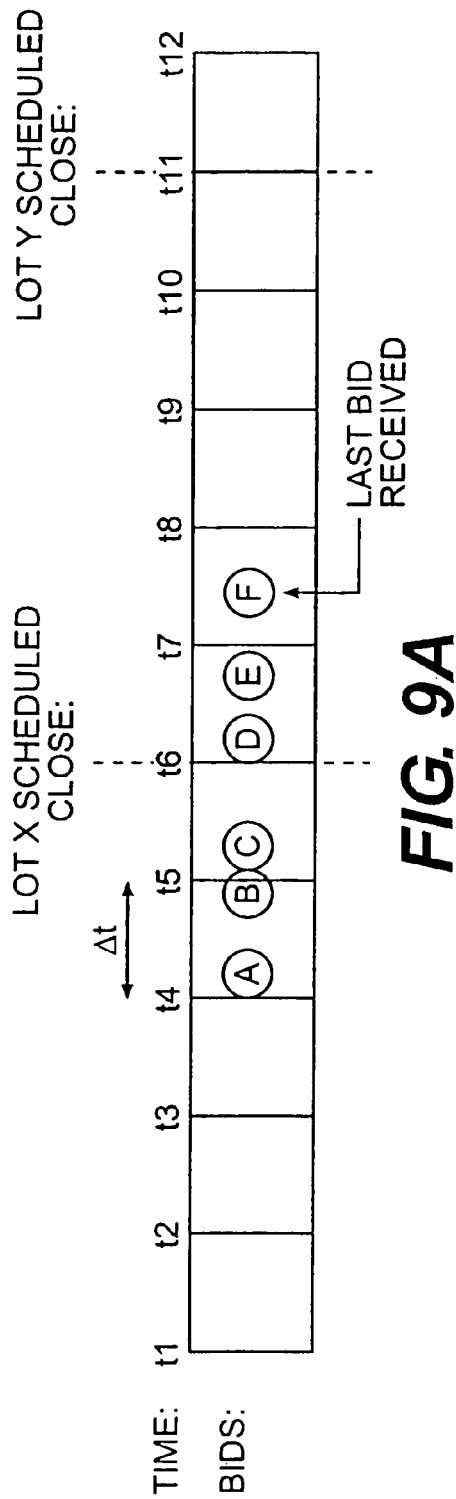
FIGS. 9A-9B illustrate the changes in bidding status and closing times for multiple lots using the dynamic lot closing extension feature.

FIG. 9A illustrates a time line divided into time intervals of $\Delta t$ between times t1, t2, etc. The scheduled bidding periods for two lots in the Auction are times t1 (the opening time for the Auction) through t6 (the initially scheduled closing time) for Lot X, and time t1-t11 for Lot Y. As described above with reference to the prior system, the scheduled closing times t6 and t11 are staggered to permit potential suppliers to focus their attention on bidding on a prior lot (Lot X) before it closes, then to turn their attention to bidding on a subsequent lot (Lot Y) with adequate time before it closes. The time interval between the initially-scheduled closing times t6 and t11 is five time increments $\Delta t$. The minimum time interval that is to be maintained between the closing time is three time increments $\Delta t$.

FIG. 9B shows the changes of status of various parameters in the auction as bids are received. FIG. 9B identifies the time interval during which the bid is received, the bidding status of Lot X before and after the bid is received, the bidding status of Lot Y before and after the bid is received, the closing time of Lot X before and after the bid is received, and the closing time of Lot Y before and after the bid is received.

The Auction begins at time t1. At the beginning of the Auction, and during the initial course of bidding, both lots have a bidding status "Open." During the course of bidding, a bid submitted on Lot X can trigger an extension of Lot X's closing time (e.g. a new market bid submitted within a predetermined amount of time before the closing time). Thus, bids A and B do not change the bidding status of Lot X or the closing times of the lots, because they are not received within a trigger period before the scheduled closing time of Lot X (in this instance, the trigger period is one interval $\Delta t$). However, bid C, which is a new low bid received within the time interval t5-t6 (within $\Delta t$ of closing time t6), triggers "Overtime" for Lot X. This is reflected in FIG. 9B, which indicates that the bidding status of Lot X was "Open" before the bid and "Overtime" after the bid. The scheduled closing time for Lot X is extended by an Overtime interval (defined in this example to be one interval $\Delta t$) from t6 to t7. Since there are still three time intervals $\Delta t$ between the closing time of Lots X and Y (t7-t11), there is no change to the closing time of Lot Y.

When Bid D is received, the status of Lot X remains "Overtime," but because it was received within one increment $\Delta t$ of the then-scheduled closing time t7, the scheduled closing time is further extended by one increment $\Delta t$ to t8. Again, there are still at least three intervals $\Delta t$ between the lots' closing times (t8-t11) so there is no effect on the closing time of Lot Y.

When Bid E is received, both the bidding status and the closing time of Lot X are unaffected, because the bid is received more than one interval before the scheduled closing time t8.

Finally, when Bid F is received in the interval between t7 and t8, the closing time for Lot X is extended by another increment $\Delta t$ to t9. Because this extension in Lot X's closing time would reduce the interval between the lots' closing times to below the minimum interval of three $\Delta t$'s, Bid F triggers Lot Y to change status from Open to Extended, and extends the closing time for Lot Y to t12.

The Extended status can be applied to more than one subsequent lot. Thus, if the rescheduled closing time for the first lot reduces the interval to the second lot's closing time to less than the minimum interval, and the second lot's closing time is therefore extended sufficiently long that it in turn is too close to the scheduled closing time of a third lot, the third lot's closing time is in turn extended to be at least the minimum interval beyond the second lot's closing time.

Figure 1:
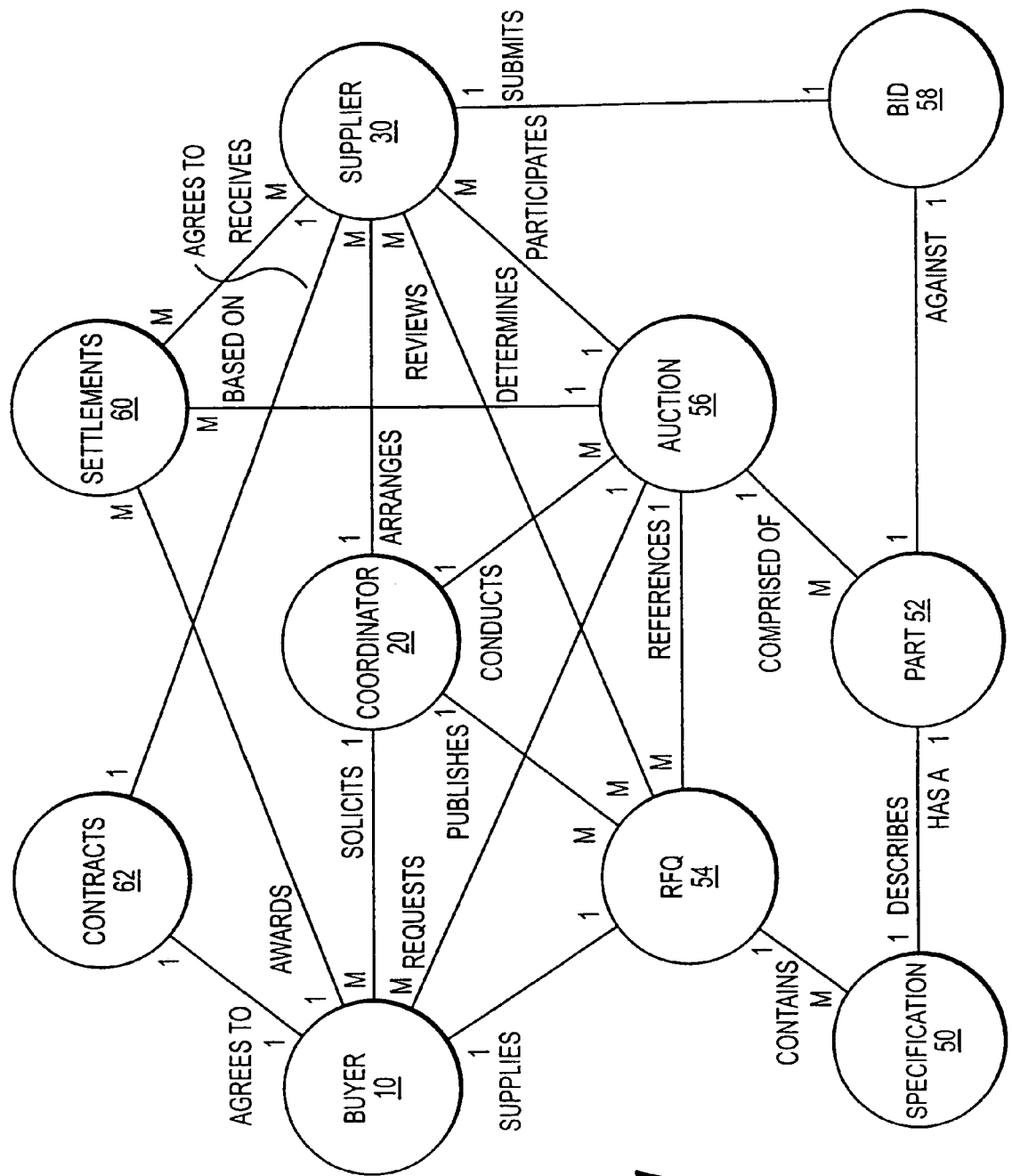
FIG. 1 is a schematic illustration of the elements and entities involved in an auction process.
Figure 3:
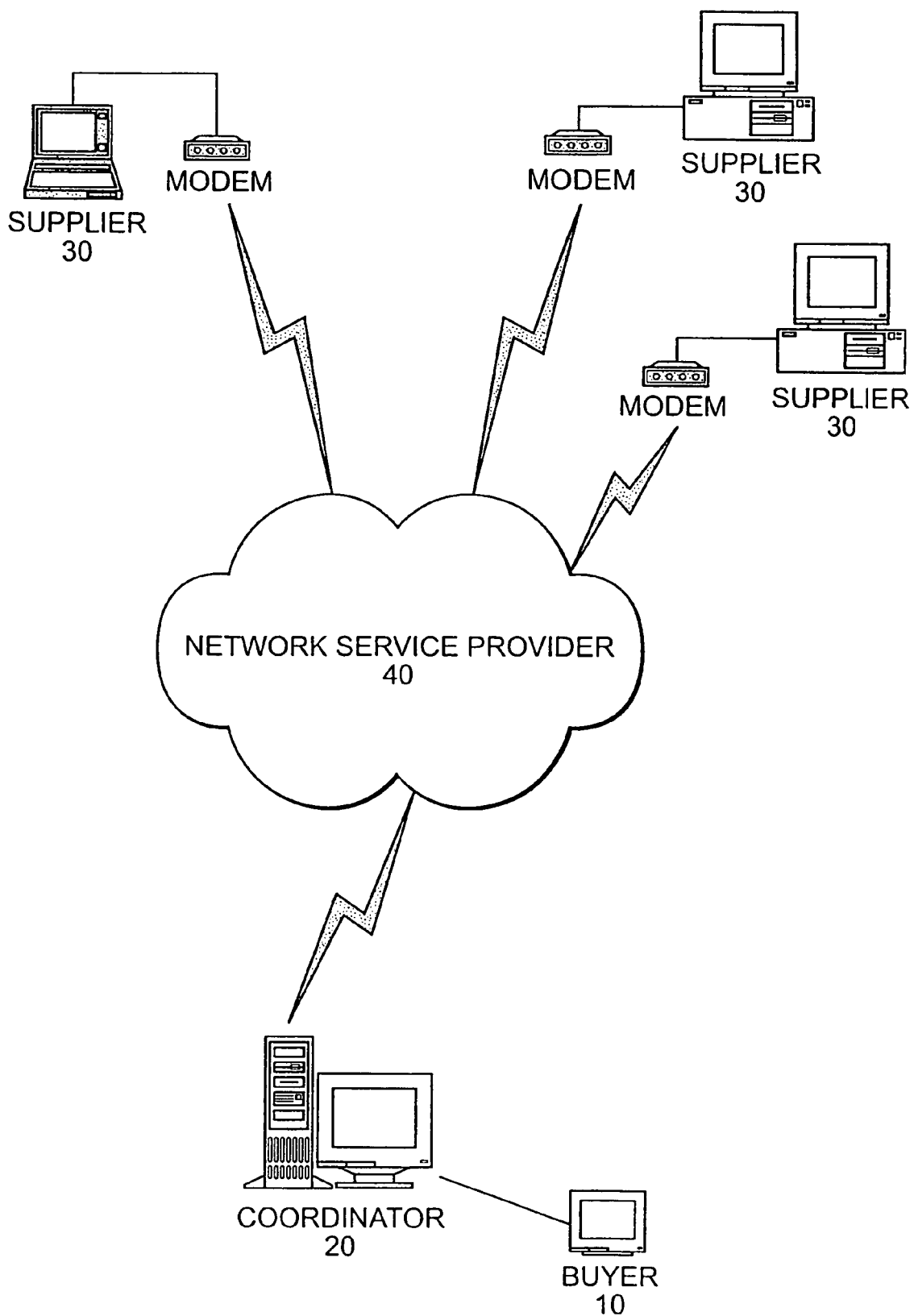
FIG. 3 is a schematic illustration of the communications links between the coordinator and the potential suppliers in an Auction.
Figure 4:
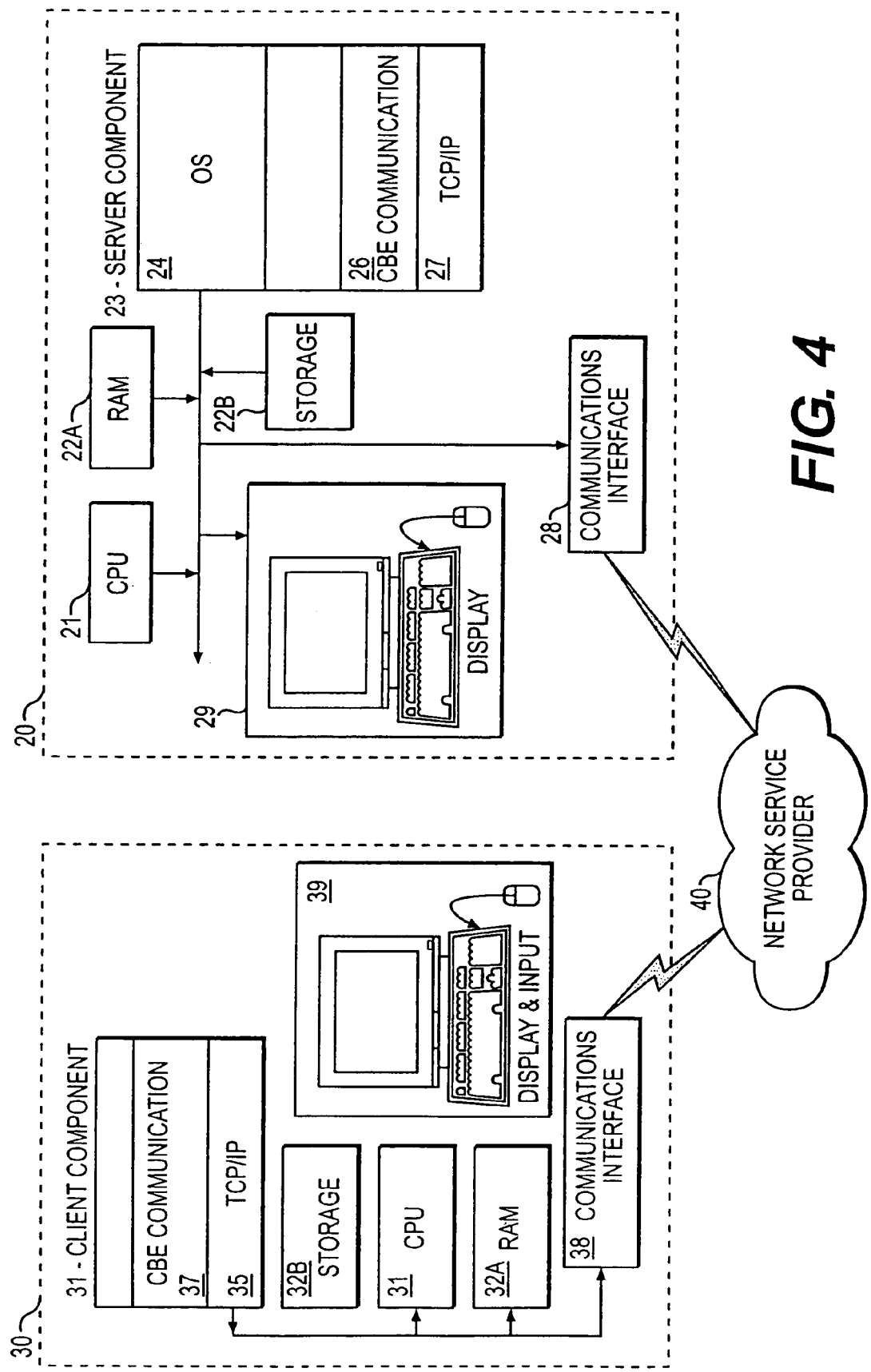
FIG. 4 is a schematic illustration of the client and server components of the computer software application that conducts the Auction and the hardware at the sites of the coordinator and the potential suppliers on which the client and server components operate.
Figures 7A, 7B:
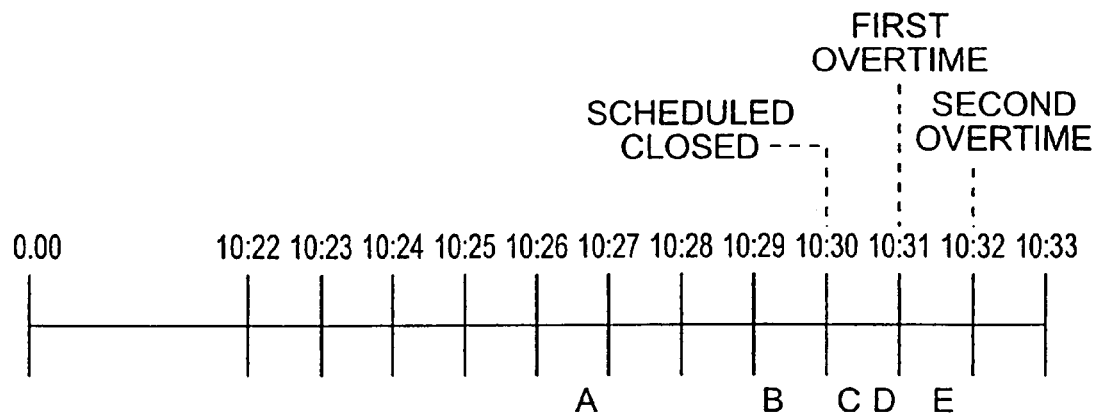
FIGS. 7A-7B illustrate the change in bidding status of one lot in the Auction illustrated in FIGS. 6A-6D.

Flexible market closing extensions is implemented in the auction system by storing a parameter in storage 22B that specifies the minimum interval between lot closings (see FIG. 4). This parameter is read from storage 22B into memory 22A for use by the server component of the application software when an Auction is loaded. When the closing time for a given lot is adjusted, the closing time for the immediately subsequent lot is evaluated to determine whether the time interval between the adjusted closing time and the subsequent lot's closing time is smaller than the minimum interval between lot closings specified. If it is, the subsequent lot's closing time is adjusted so that the difference between the two equals the minimum interval. If it is not, no adjustment is made to the closing time of the subsequent interval.

In an alternative embodiment, multiple parameters are stored in storage 22B. These multiple parameters specify the individual minimum intervals between the closing times of the multiple lots. The individual minimum intervals can be based upon the characteristics of the lot itself or various indicia reflective of the market activity for the lot. The individual minimum intervals can therefore be dynamic in nature.

Figure 11:
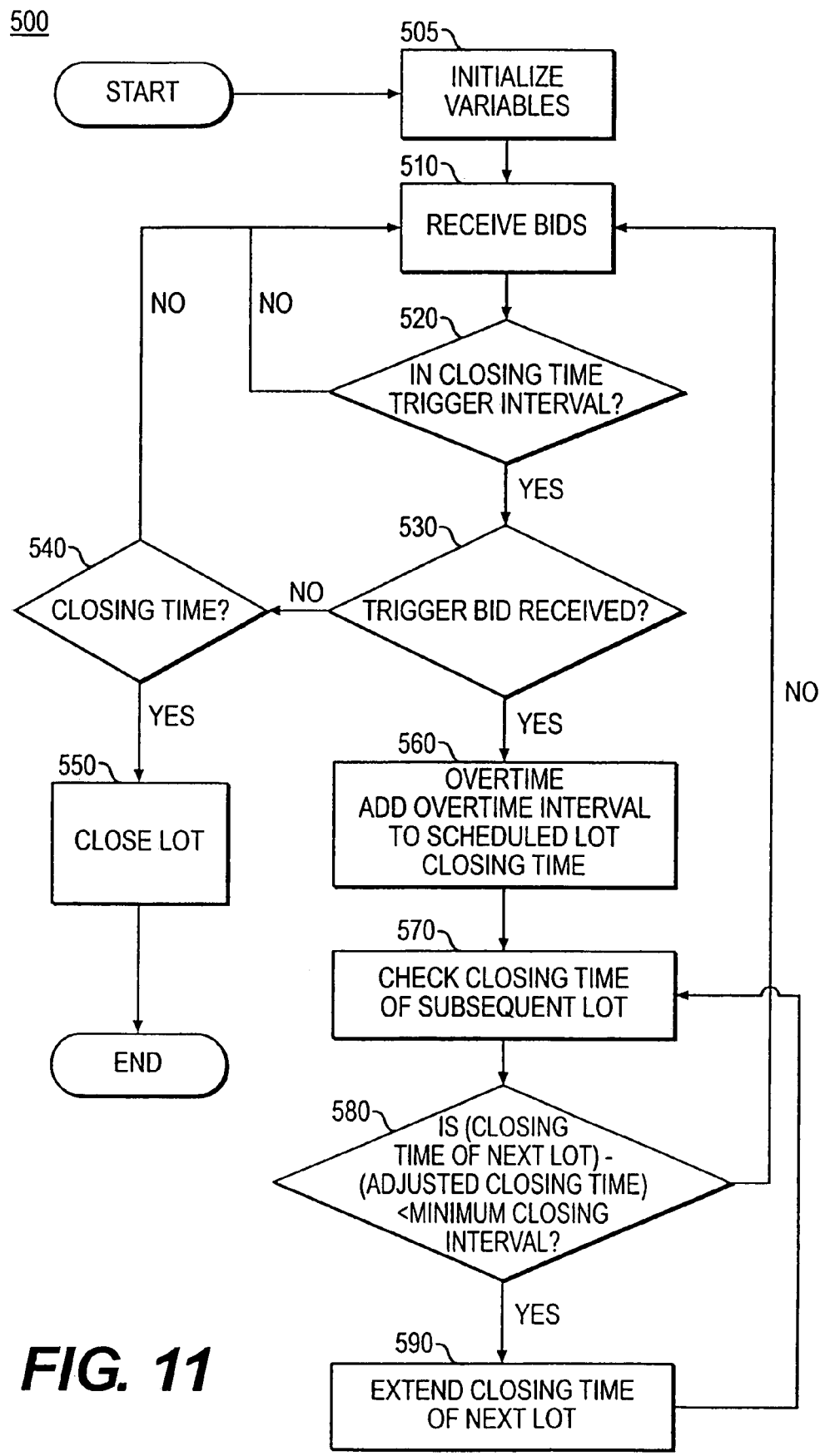
FIG. 11 is a flow chart illustrating the operation of the dynamic lot closing extension feature.

The operation of the flexible market closing extensions feature is illustrated in the flow chart of FIG. 11. The process for dynamically extending the closing time of multiple lots is shown as process 500. The Auction continually receives bids at step 510 until a predetermined interval of time before the scheduled closing time (the closing trigger interval). This is shown by the step 510-step 520 loop. At the closing trigger interval time, the software checks to see if any trigger bids have been made at step 530. For example, if the closing time interval is 2 minutes, then at 2 minutes before the scheduled closing of the lot, the software will check to see whether any trigger bids have been made.

If no trigger bids have been made, the software checks to see whether it is closing time at step 540 before continuing to accept bids at step 510. The step 510-step 520-step 530-step 540 loop may occur many times during the closing time trigger interval. If no trigger bids are received during this time, then the lot closes at step 550 at the scheduled closing time.

If there is a trigger bid received during this time, then the process continues to step 560, where an Overtime interval is added to the scheduled closing time for that lot. The software then checks the closing time of the subsequent lot in step 570. A comparison is made in step 580 to determine if the closing time of the subsequent lot needs to be dynamically altered. If the interval of time between the scheduled closing time of the Overtime lot and the scheduled closing time of the next lot is greater than or equal to the minimum lot closing interval, then no extensions are necessary, and the process returns to step 510, where bids for the current lot are again received.

If the interval of time between the newly scheduled closing time of the current lot and the scheduled closing time of the next lot is less than the minimum closing interval, then the next lot needs to be extended to maintain the minimum closing time interval. This occurs in step 590.

If the next lot has to be extended, there is a chance, after multiple extensions, that it will run into the lot following it. Therefore, loop 590-570-580 is processed to check subsequent lots, and extend them if necessary, to maintain the minimum closing interval between each lot. This loop is executed until all lots as necessary have been extended to maintain the minimum closing interval, at which point, bids for the current lot are again received at step 510.

Flexible Overtime

As described above, the prior auction system employed a simple, static model for Overtime, in which Overtime was triggered by a new low bid submitted within a predetermined time interval before a scheduled closing time, and the scheduled closing time was extended by a predetermined time period. This rule can be articulated as: "a market-setting low bid, received in the appropriate increment Δt before a scheduled closing triggers overtime and adds an increment Δt to the scheduled closing time." This Overtime rule was applied to all Auctions, to all lots in an Auction, at all times during an Auction. The flexible overtime feature of the present auction system addresses the shortcomings of the prior static overtime feature.

Flexible overtime has two aspects: variable duration of overtime intervals and variable overtime triggers. The variable duration aspect involves overtime extension intervals (time intervals by which a scheduled closing time, whether an initially-scheduled time or an extended time, is extended) and overtime trigger intervals (intervals before a scheduled closing time in which a bid meeting defined criteria will trigger overtime). These intervals can be the same (as in the prior system), or can be different from each other. The intervals can vary in length from lot to lot. Thus, the first lot might have an overtime extension interval and an overtime trigger interval of 1 minute, while a second, more complex or significant lot might have intervals of 2 minutes.

The second aspect of flexible overtime is variable overtime triggers. The trigger for each lot is bid-related, in that it involves an evaluation of some attribute or attributes of a bid against one or more trigger criteria. In the prior system, the attribute of a bid that was evaluated was the price of the bid with respect to the current best (lowest priced) bid. Overtime was triggered if the price of a new bid submitted within the appropriate interval was lower than the current best bid. In the disclosed auction system, overtime triggers can be based on other parameters and criteria. For example, the rank of a bid can be considered, and overtime triggered based in part on whether the rank of the bid is lower than the established criterion. Thus, the criterion can be established that a trigger bid must be a bid that is a new best bid or is the second or third best bid.

A further possible criterion, which can be applied in tandem with or independent of the ranking criterion, is that the bid must be sufficiently close to the best bid in terms of some parameter of quality. For the simplest bid evaluation, the parameter of quality for a bid is the bid price (e.g. in dollars). The criterion can be established that a trigger bid must have a price that is lower than, or higher than but within a predetermined absolute or percentage difference from, the current best bid.

Thus, decision rules for overtime triggering can be defined in different ways, such as:

A bid within 2% of the price of the then-low bid, if received within the appropriate time interval before the scheduled close time, triggers overtime Any bid, if received in the appropriate interval before a scheduled close, triggers overtime bid by a supplier identified to the server as an incumbent supplier, if received in the appropriate time interval before a scheduled close, triggers overtime.

It might also be desirable to include the option to vary the overtime extension interval dynamically during the course of the Auction.

It should be noted that an overtime trigger can also be based upon evaluations of the characteristics of a subgroup or the entire group of bids (e.g., increase in frequency of bids, statistical analysis of bid values for entire group or particular supplier). As a general rule, the overtime trigger seeks to extend the auction for a lot if there is any indication that further bidding would somehow be advantageous to the buyer.

Flexible overtime can be implemented in the illustrated auction system in a variety of ways. In one embodiment, a parameter is stored in storage 22B that specifies the length of the overtime period for each lot. This parameter is read from storage 22B into memory 22A for use by the server component of the application software when an Auction is loaded. When overtime is triggered on a given lot, the server component adds the value of that lot's overtime parameter to the market closing time, adjusting its closing time accordingly.

Second, flexible overtime triggers are implemented by storing two parameters (in the same manner as the other parameters above): one that specifies the market rank necessary for a bid to trigger overtime and one that specifies a maximum distance, expressed as either a percentage or a nominal value, that a bid can be from the market-leading bid to trigger overtime. Each bid received is evaluated against these parameters to determine whether overtime should be triggered.

In an alternate embodiment, flexible overtime triggers are implemented by writing a specific module of code for each lot and referencing that code by the server component each time a bid is entered. The code module takes as input parameters such as the current bid, the next closest bid, the current bid time, the next closest bid time, the current low bid, the low bid time, the then-scheduled close time, etc. Using logic that can be tailored to each lot, the code module returns a value of "true" if that bid should trigger an overtime, or "false" if it should not.

Figure 12:
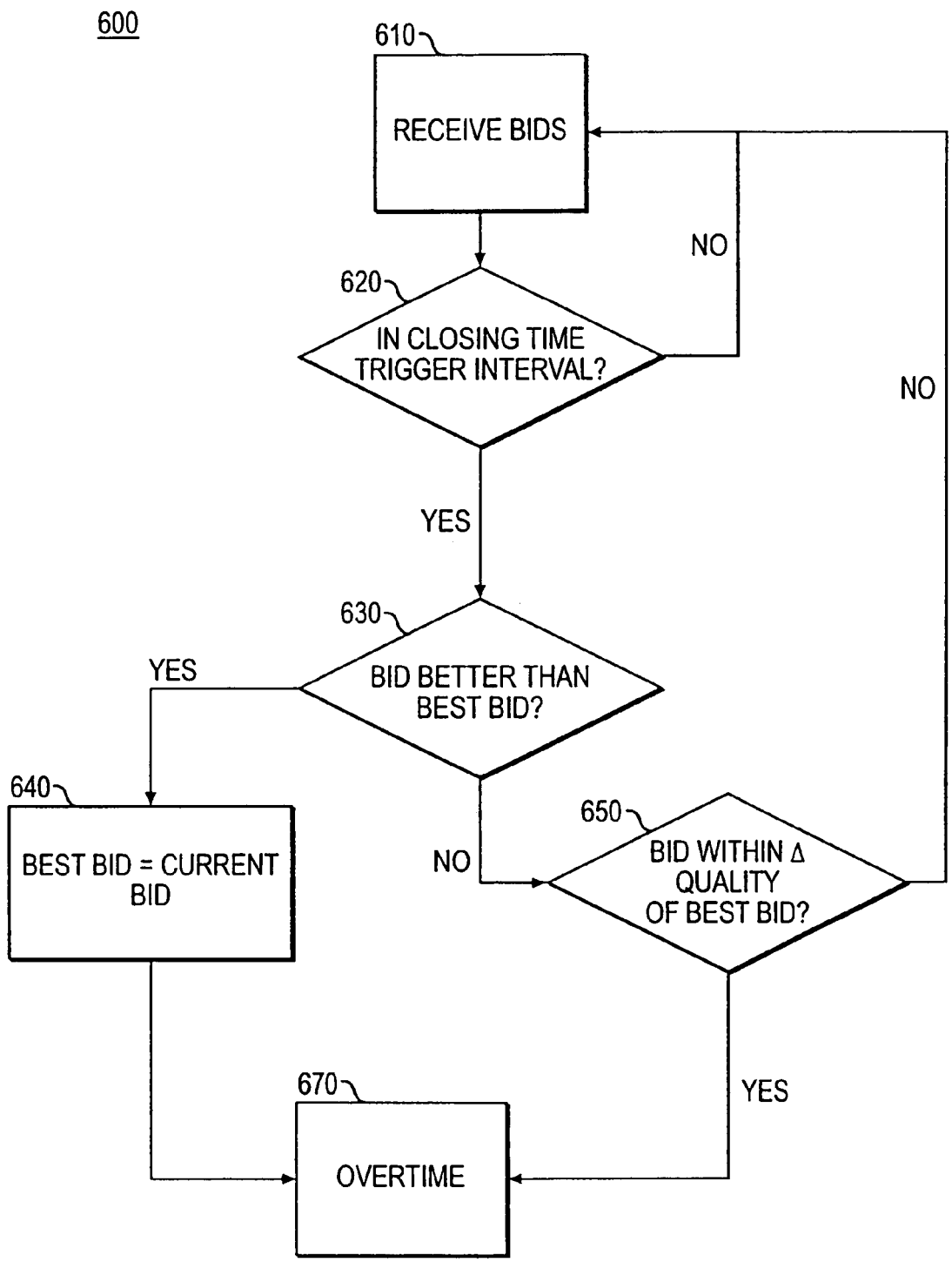
FIG. 12 is a flow chart illustrating the operation of the flexible overtime feature.

The operation of the flexible overtime feature is illustrated in the flow chart in FIG. 12 for process 600. Bids are received at step 610 until it is closing time for the current lot. In step 620, a determination is made whether the current bid was submitted during a closing time trigger interval (i.e. in the trigger interval before the currently-scheduled closing time). If not, the process loops back to step 610 until the next bid is received. If so, the bid is then evaluated at step 630 to determine if it is "better" (by whatever quality parameter is selected, such as price) than the current best bid. If so, then the process goes to step 640, where the best bid is set equal to the current bid. Under the rule set implemented in this embodiment, a new best bid in the overtime trigger interval always triggers overtime—the process therefore proceeds to step 670, where overtime is initiated (or extended). If the current bid is not better than the best bid, the process proceeds from step 630 to step 650, where the determination is made whether the bid otherwise meets the overtime trigger criterion. In this case, the test is whether the bid is within some predetermined amount of a selected quality parameter (e.g. price) of the best bid. If it is, overtime is triggered (or extended). If not, the process loops back to step 610 to receive the next bid.

Flexible Bidder-Determined Line Item Decision Rules

This bidding feature of the auction system of the invention provides a method for allowing bidders to bid at the lot or line item level, while maintaining flexible decision rules on individual line items. Generally, a flexible line-item decision rule enables a buyer to automatically adjust aspects of line item level bids based upon one or more inputs at the lot or line item level.

In one embodiment, a flexible line-item decision rule is implemented by creating fixed and variable components of a bid on each of the line items that comprise a lot. Limits for individual items can be established at the initial price quote entered for that item or at a floor or ceiling below or above the initial quote. Different limits can be set for different line items and limits can be set across some or all of the items or components within a lot or market.

When bids are decreased at the lot level, the amount by which they are decreased at the line item level is pro rated across the unlocked portion of the line item price bids. Pro rata adjustments will not affect the locked (or fixed) component of the line items. Thus, the locked portion remains unchanged. However, limits can be locked and unlocked dynamically during the course of an Auction by the bidder.

This particular flexible line-item decision rule allows bidders to lock in a fixed and a variable portion of the price quote prior to the bid. Total bids for a lot can then be adjusted rapidly in response to market activity without changing individual item quotes to uneconomic levels. Further, bidders have the comfort of setting floors or ceilings on all or part of individual line item bids. During the Auction, fixed components can be re-evaluated and unlocked if necessary in response to movement in the market for the lot beyond original expectations.

In a case where a total bid is decreased by more than the sum of all unlocked line item bids, the bid is rejected. Therefore, a total bid will never be less than the sum of the locked portion of the line item bids. Items can be locked or unlocked at any time during the bidding event.

An example of the Lock/Unlock feature is shown below. Initially, line item 1 is partially locked and line item 2 is entirely unlocked.

| Line Item | Locked | Unlocked | Total Price |
|---|---|---|---|
| 1 | $1.00 | $ 9.00 | $10.00 |
| 2 | $0.00 | $20.00 | $20.00 |
| | | | $30.00 Lot Price |

The bidder chooses to drop the lot price, by 10% (or $3). The $3 adjustment is then apportioned on a pro rata basis to the unlocked portions of the individual line item bids. In this case, line item #1 is reduced by $0.93 (i.e., $3×9/29), and line item #2 is reduced by $2.07 (i.e., $3×20/29). The result of these pro rata line item adjustments is reflected by the following:

| Line Item | Locked | Unlocked | Total Price |
|---|---|---|---|
| 1 | $1.00 | $ 8.07 | $9.07 |
| 2 | $0.00 | $17.93 | $17.93 |
| | | | $27.00 Lot Price |

The locked/unlocked feature is implemented in the auction system by data structures maintained in the client software that support capture of locked and unlocked unit price bids at the line item level and by providing a user interface to accept the locked/unlocked information from the bidder.

It should be noted that the locked/unlocked feature represents only one example of a flexible line-item decision rule that can be implemented. Generally, a line item bid can be adjusted based upon one or more changes at the lot or line item level. These flexible line-item decision rule can be created to accommodate any pre-auction bidding strategy that could be jeopardized by the bidder's interaction in a real-time auction event. For example, a customized flexible line-item decision rule can be created such that the price of a first line item maintains a specified proportion to the price of a second line item. This particular flexible line-item decision rule may be important where the bidder must ensure that one or more particular line item bids conform to internal corporate guidelines (e.g., marketing, accounting, sales, etc.). More generally, it is contemplated by the present invention that any aspect of a line item bid (e.g., unit price, quantity, delivery time, line item characteristic, etc.) can be related to, and thereby adjusted, based upon a change in one or more aspects of the supplier's bid at either the lot or line item level.

Pending Status

The pending status feature of the auction system of the invention provides an intermediate bidding status for each lot to transition the lot from a status in which bids can be submitted (Open, Overtime, Extended) to a status in which bids will no longer be accepted (Closed). The intermediate bidding status is "Pending." This status indicates that bids are not being accepted on the lot but that the lot may subsequently be returned to Open status for bidding. This allows a time period for a bidder who has missed an opportunity to bid because of a technical fault (e.g. communications or computer hardware or software failure) to contact the coordinator to alert the coordinator to the fault. The coordinator can then evaluate the asserted fault and determine whether it is appropriate to allow further bidding on the lot. If so, the lot can be returned to Open status for bidding. If not, the lot is Closed. The lot can be returned to Open status immediately upon the determination by the coordinator that this is appropriate, or it can be held in Pending status while a convenient time to re-open is scheduled.

Pending status is implemented in the illustrated auction system by storing two parameters in storage 22B: one parameter that specifies the length of the pending interval and one that specifies whether a lot should automatically close when that interval expires. The length parameter can be set differently for each lot. These parameters are read from storage 22B into memory 22A for use by the server component of the application software when an Auction is loaded. When the scheduled closing time for a lot is reached, the bidding status is set to "Pending" instead of "Closed." If the automatic close flag is set to "YES", then a clock begins to count down the pending interval. If no other intervention takes place and the pending interval expires, then the lot is closed automatically. If the automatic close flag is set to "NO," then the lot will remain in the Pending status until manual intervention takes place. Manual intervention in either case can take the form of changing the automatic close flag (either from NO to YES or from YES to NO), returning the lot to open status and setting a new close time, or manually closing the market.

Figure 13:
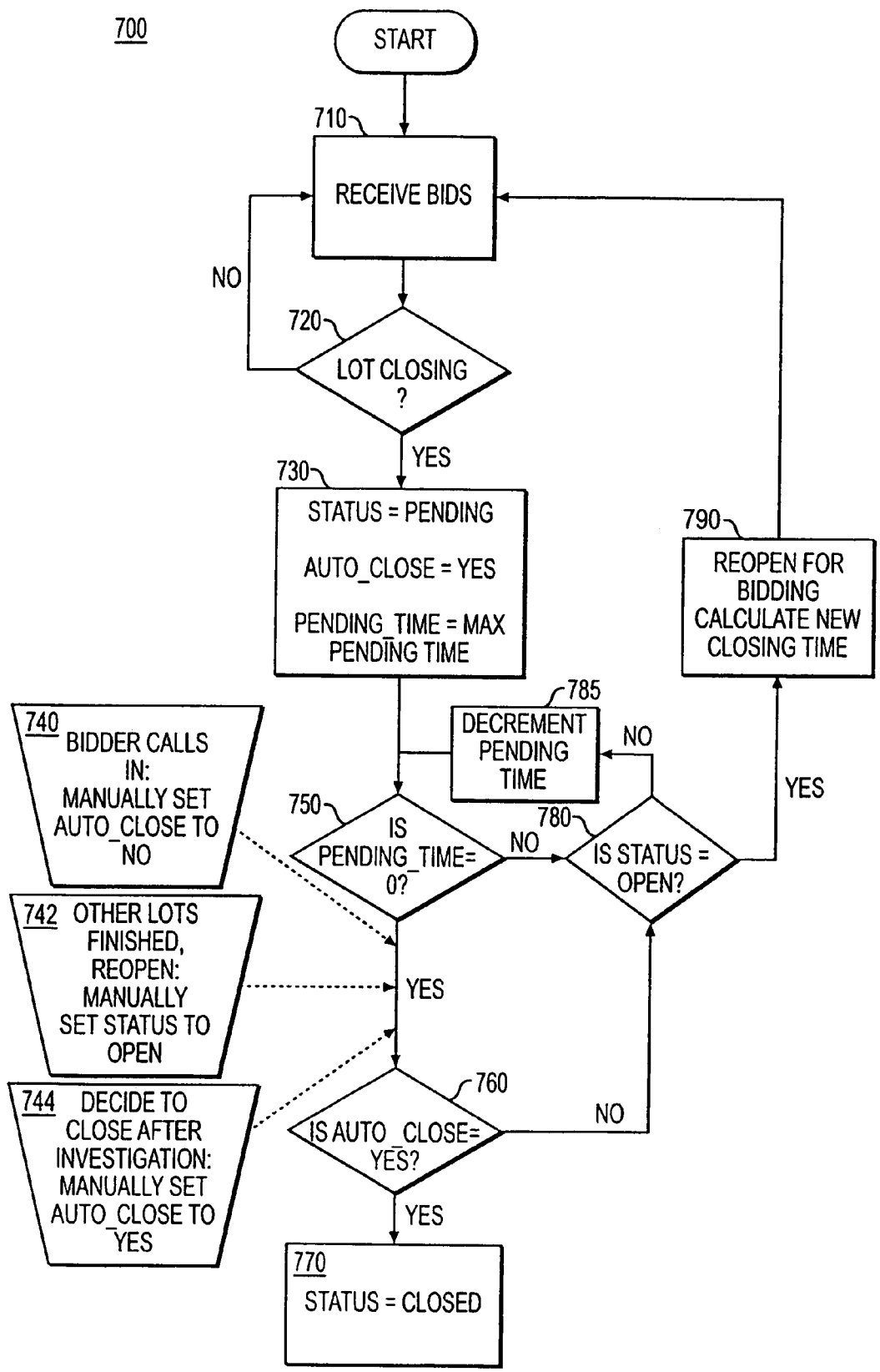
FIG. 13 is a flow chart illustrating the operation of the pending feature.
Figure 14:
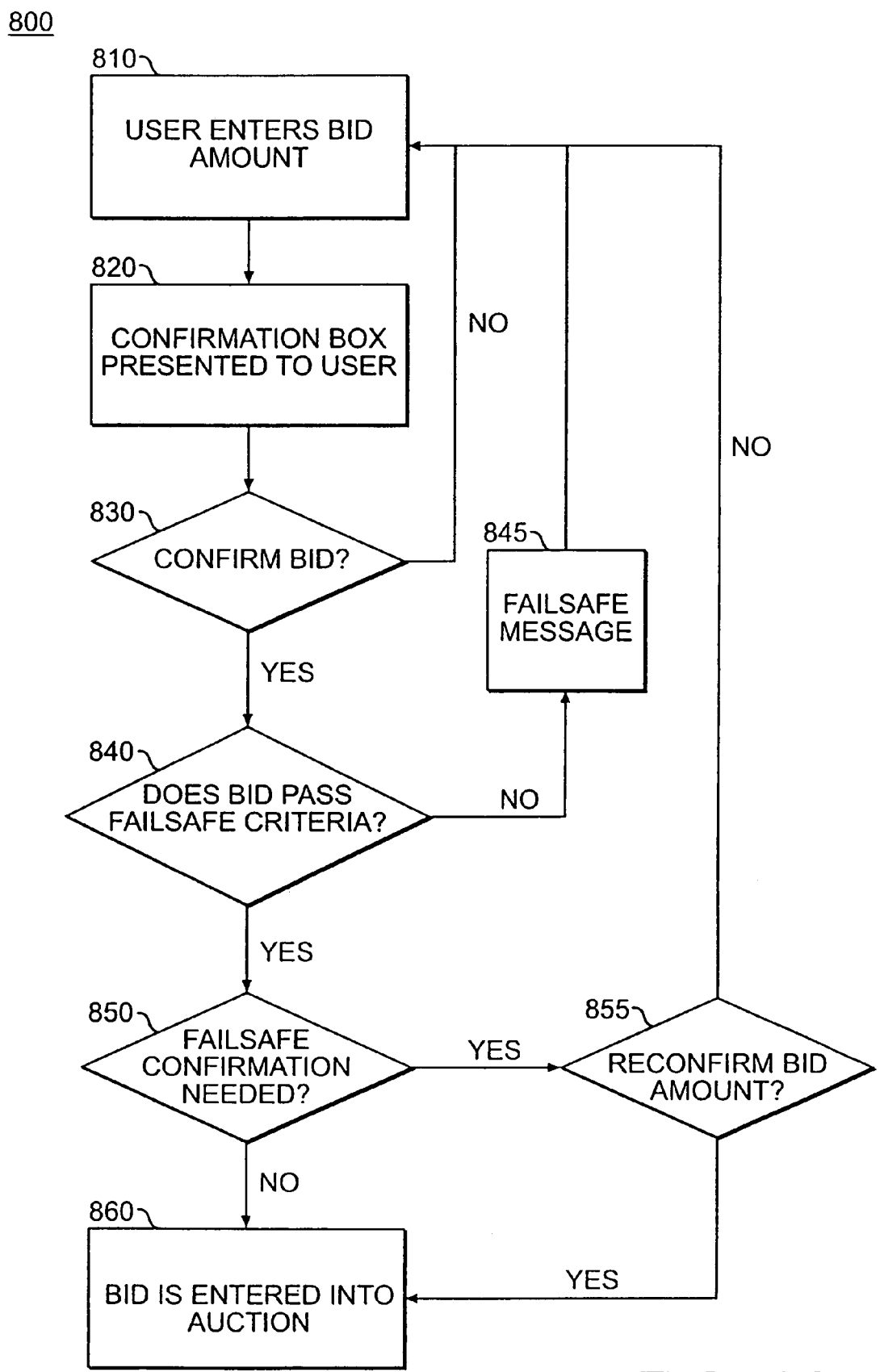
FIG. 14 is a flow chart illustrating the operation of the failsafe error detection features.

The operation of the pending status feature is illustrated in the flow chart of FIG. 13, as shown in process 700. Bids are received at step 710 until it is closing time for the current lot at step 720. Although not shown in FIG. 13, this process can include Overtimes and Extensions as described above. At the actual lot closing time, the software sets up for processing the pending status at step 730. Here Status is set to "Pending", the Auto_close flag is set to YES and the pending clock is started (pending_time=maximum pending time).

At this point, if no external events occur, the lot will remain in the Pending state through the pending time, and then become Closed. This is reflected through steps 750-780-785-760-770. The step 750-step 780 loop is executed throughout the pending period until pending_time is 0, at which point step 760 is executed. Nothing has occurred that would change the value of Auto_close, so it is still YES, therefore step 770 will be executed, and the lot closes.

One external event that can occur is a bidder calling the coordinator during the Pending period to communicate problems that occurred during the bidding for that lot. If this happens, the coordinator manually changes Auto_close to NO in external event step 740. This will not affect anything in the loop 750-780—the software continues to check the status during the pending time, but not the Auto_close flag. At the end of the pending time, step 760 is executed. This time, since Auto_close was changed to NO by the coordinator, the process loops back to step 780, where the status is checked. The loop 750-760-780 will be executed repeatedly until the coordinator manually changes either the Auto_close flag or the Status. If after investigation, it turns out that the bidding does not need to be returned to open status, then the coordinator can change the Auto_close flag back to YES 744, and the process will exit the loop at step 760, going to step 770, and closing the lot. If after investigation it is decided that the bidding should be reopened for that lot, the coordinator can manually change the status to OPEN. After the status is changed, the loop will exit at step 780, going to step 790. The closing time for this lot will be adjusted to a new scheduled closing time, and the Auction will start receiving bids again for that lot at step 710. The entire process 700 is repeated.

Bidding Statuses

Figure 10:
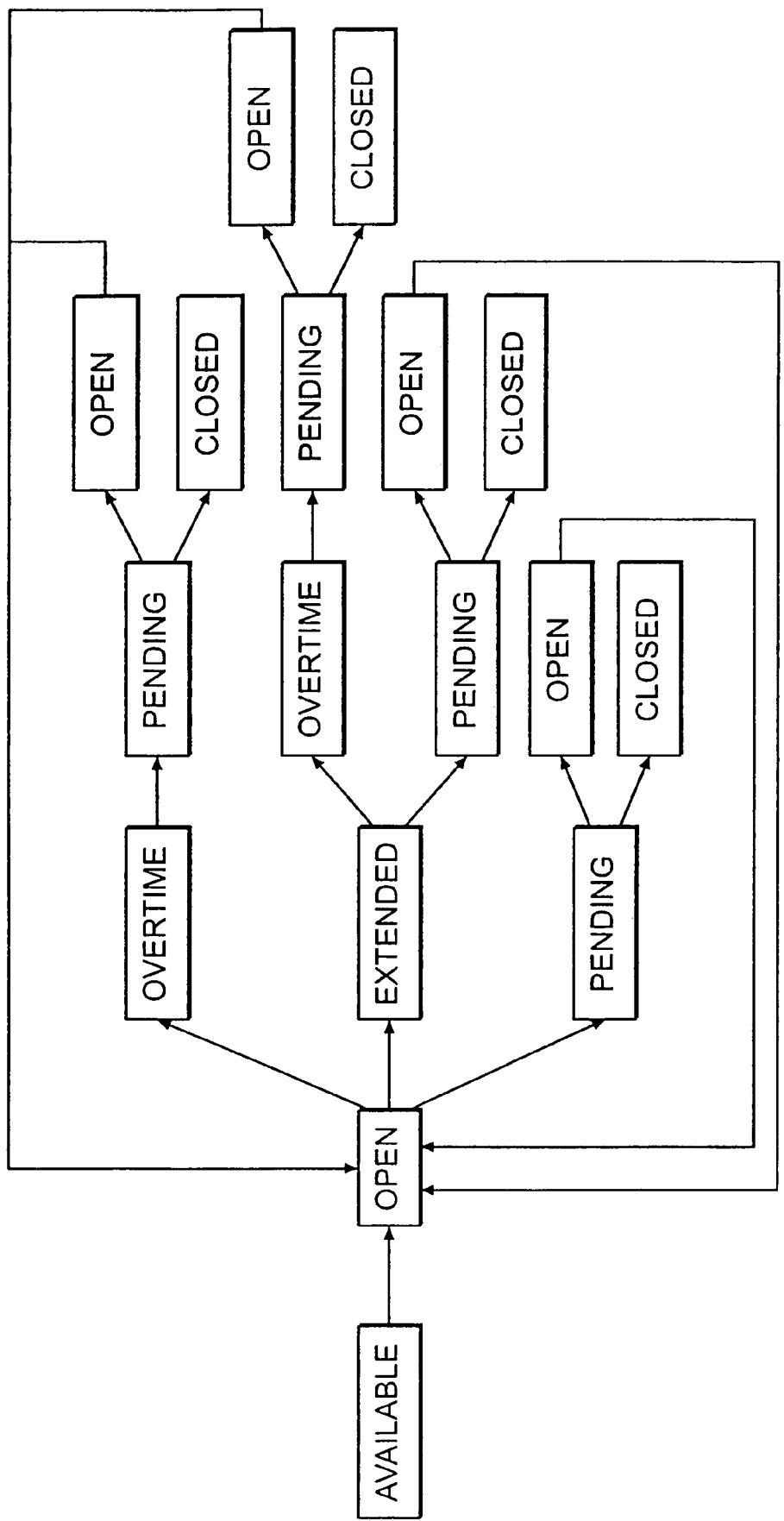
FIG. 10 is a schematic illustration of the possible bidding states in the auction system.

The possible bidding statuses for the present auction system and method are identified in FIG. 10. In addition to the statuses identified in FIG. 5 for the prior auction system, the present system includes the statuses of Extended and Pending. As shown in FIG. 10, a lot can change from Open status to Overtime, Extended or Pending. A lot can change from Overtime to Pending status. Further, a lot can change from Pending to Open or Closed status.

Auction Pause

Auction Pause allows the auction coordinator to indefinitely "freeze" an auction, without disrupting the bids placed before the pause went into effect. The pause status can be applied to an entire auction (all lots) or to specific lots within an auction. The Pause status can be applied at any time during an auction and will override any other status currently in effect. While in Pause status, all existing bids are preserved. An entire auction (or individual auction lots) can be held in Pause status for an indefinite period of time. In one embodiment, no bidder is able to submit bids while the auction is in Pause status. In an alternate embodiment, bids may continue to be received but would not be entered into the auction. In this embodiment, bids could be held in a queue awaiting entry upon the removal of the Pause status.

The auction coordinator determines the lot status that applies once the pause is removed. While in Pause status, the auction server clock will continue to operate. Hence, without any intervention by the auction coordinator, the lot status that applies once the pause is removed will be the lot status that would have been in effect in the normal course of operations had it not been for the pause (the underlying status). For example, if the scheduled lot closing time passes while the lot is in pause, and the auction coordinator lifts the pause status, the auction lot will return to "Closed" status. However, the auction coordinator can alter the scheduled timing that applies to all lots (i.e. alter the opening and closing times) to ensure the correct lot status applies once the pause is removed. Thus, all bidders see the auction server clock match the correct time while the auction coordinator can achieve any relevant lot status once the pause is removed.

For example, as shown below in Table 1, an online auction is scheduled to open at 9:00 am at which time all lots will open. Current time is 8:45 AM so all lots are currently in Available status.

TABLE 1

| Lot # | Lot Name | Opening Time | Closing Time | Current Time: 8:45:52 AM Status |
|---|---|---|---|---|
| 1 | Screws | 9:00:00 AM | 9:30:00 AM | Available |
| 2 | Nuts | 9:00:00 AM | 10:00:00 AM | Available |
| 3 | Bolts | 9:00:00 AM | 10:30:00 AM | Available |

Suppose there is a technical disruption at 8:50 AM and the auction coordinator is not sure how long it will take to resolve the issue. Instead of canceling the auction, the auction coordinator places the entire auction in Pause status. The auction now appears as shown in Table 2.

TABLE 2

| Lot # | Lot Name | Opening Time | Closing Time | Current Time: 8:50:31 AM Status |
|---|---|---|---|---|
| 1 | Screws | 9:00:00 AM | 9:30:00 AM | Pause |
| 2 | Nuts | 9:00:00 AM | 10:00:00 AM | Pause |
| 3 | Bolts | 9:00:00 AM | 10:30:00 AM | Pause |

The technical disruption is resolved at 9:32 AM. At this point, if the auction coordinator lifted the Pause status, Lot 1 would immediately go to Pending and then to Close three minutes later. (In this example, the pending interval has been set to a total of 5 minutes after scheduled close by the auction coordinator.) Bidders would therefore not have an opportunity to place bids for Lot 1. To avoid this outcome, the auction coordinator decides to alter the opening times for all lots to 9:45 AM and shift the closing times to 30-minutes intervals thereafter. Once the Pause is lifted, this has the effect of returning all lots to Available status, and bidders can commence bidding when the lots open at 9:45 AM. The auction now appears as shown in Table 3. Note that the auction coordinator could also have shifted the closing times only. In that case, all lots would have gone to Open status and bidders could have commenced bidding immediately.

TABLE 3

| Lot # | Lot Name | Opening Time | Current Time: 9:32:22 AM | |
| | | | Closing Time | Status |
| --- | --- | --- | --- | --- |
| 1 | Screws | 9:45:00 AM | 10:15:00 AM | Available |
| 2 | Nuts | 9:45:00 AM | 10:45:00 AM | Available |
| 3 | Bolts | 9:45:00 AM | 11:15:00 AM | Available |

Bidding begins on all of the lots at 9:45 AM. Then a second technical disruption occurs at 10:10 AM. This interruption is estimated to take at least 10 minutes to resolve, which will not be fast enough to prevent Lot 1 shifting to Pending status at 10:15 AM and Closed status at 10:20 am (assuming a 5 minute Pending interval). In addition, since all lots are currently open, bids have already been placed on Lots 2 and 3. As the duration of the interruption is unknown, the auction coordinator decides to once again place all lots in Pause status until the technical difficulty is resolved. Bidders are prevented from entering bids during this time or bids may be placed into a queue to await the lifting of the Pause status, but all existing bids are preserved. The auction now appears as shown in Table 4.

TABLE 4

| Lot # | Lot Name | Opening Time | Current Time: 10:10:09 AM | |
| | | | Closing Time | Status |
| --- | --- | --- | --- | --- |
| 1 | Screws | 9:45:00 AM | 10:15:00 AM | Pause |
| 2 | Nuts | 9:45:00 AM | 10:45:00 AM | Pause |
| 3 | Bolts | 9:45:00 AM | 11:15:00 AM | Pause |

The technical disruption is resolved at 10:30 AM. The auction coordinator alters the closing times (but not the opening times) of the lots to give the bidders an additional 10 minutes to bid on Lot 1, and to space out the closing times of Lots 2 and 3 at 20 minute intervals. The auction coordinator does not change the opening times of the lots, and therefore preserves bids that have already been made. All lots return to Open status when the Auction Pause is lifted and may commence bidding immediately. The auction now appears as shown in Table 5.

TABLE 5

| Lot # | Lot Name | Opening Time | Current Time: 10:30:25 AM | |
| | | | Closing Time | Status |
| --- | --- | --- | --- | --- |
| 1 | Screws | 9:45:00 AM | 10:40:00 AM | Open |
| 2 | Nuts | 9:45:00 AM | 11:00:00 AM | Open |
| 3 | Bolts | 9:45:00 AM | 11:20:00 AM | Open |

Bidding continues on Lot 1 until 10:55 before the final bid is placed and the lot shifts to Pending status (i.e. 15 minutes of Overtime). Assuming a minimum interval of 10 minutes between lot closing times, this will push Lot 2 into Extended status moving the scheduled closing time back to 11:05 AM. The auction now appears as shown in Table 6.

TABLE 6

| Lot # | Lot Name | Opening Time | Current Time: 10:55:07 AM | |
| | | | Closing Time | Status |
| --- | --- | --- | --- | --- |
| 1 | Screws | 9:45:00 AM | 10:55:00 AM | Pending |
| 2 | Nuts | 9:45:00 AM | 11:05:00 AM | Extended |
| 3 | Bolts | 9:45:00 AM | 11:20:00 AM | Open |

Now it is discovered that some, but not all, of the bidders on Lot 2 have made an incorrect assumption in preparing their quotes. The auction coordinator needs time to communicate with all bidders and correct the error, and estimates that this will require 10-15 minutes. Therefore it will take too long to give all bidders an equal chance of understanding the situation before Lot 2 closes. However, there is no disruption to Lot 3, which can continue as scheduled. The auction coordinator places Lot 2 in the Pause status, and changes the scheduled closing time for Lot 2 to 11:40 AM. No change is made to Lot 3. Bidding continues on Lot 3, but no bids can be placed on Lot 2 at this point. Lot 2 is now scheduled to close after Lot 3. The auction now appears as in Table 7.

TABLE 7

| Lot # | Lot Name | Opening Time | Current Time: 10:56:12 AM | |
| | | | Closing Time | Status |
| --- | --- | --- | --- | --- |
| 1 | Screws | 9:45:00 AM | 10:55:00 AM | Pending |
| 2 | Nuts | 9:45:00 AM | 11:40:00 AM | Pause |
| 3 | Bolts | 9:45:00 AM | 11:20:00 AM | Open |

By 11:17, all of the bidders have received the correct information for Lot 2 and re-calculated their bids. At this point, the Lot Pause can be lifted from Lot 2. Although bidders are now engaged in the activity leading up to the close of Lot 3, the lot extension buffer will ensure that bidders have adequate time to return to Lot 2 once Lot 3 bidding ends. The auction now appears as shown in Table 8.

TABLE 8

| Lot # | Lot Name | Opening Time | Current Time: 11:17:22 AM | |
| | | | Closing Time | Status |
| --- | --- | --- | --- | --- |
| 1 | Screws | 9:45:00 AM | 10:55:00 AM | Closed |
| 2 | Nuts | 9:45:00 AM | 11:40:00 AM | Open |
| 3 | Bolts | 9:45:00 AM | 11:20:00 AM | Open |

The lot statuses will now follow their normal procedures through to the end of the auction.

Bidder-Specific Bid Limitations

It is common for sellers (upward auctions) and buyers (downward auctions) to place market limitations on the amounts that bidders may submit as valid bids during the course of an online auction. For example, a buyer may require that bidding start below a certain ceiling. In this case, the buyer is not interested in making a purchase at any price above that limit, and bids submitted above that ceiling are not accepted. Such a limitation applies across the board to all potential bidders (suppliers).

Use of a market-wide bid limitation is inadequate where the buyer can obtain some form of price discovery with respect to individual bidders prior to the online auction. For example, it is not uncommon in industrial procurement for the buyer to receive bids from potential suppliers prior to an online auction. The buyer may have solicited a "first round" of bids ("pre-bids") prior to deciding to conduct the online auction, or a series of bids may arrive without solicitation from the buyer. At this point, the buyer has three options for conducting the online auction:

A first option is to set a ceiling at the highest pre-bid. In this case, suppliers who submitted lower pre-bids prior to the online auction may commence bidding at a level higher than their pre-bids. During the course of the event, the bidding activity may not reach the level of the lowest pre-bid. This could occur for one of two reasons.

First, since the pre-bids are still valid quotations, and there ends up being little competition from other suppliers, the leaders may feel no need to bid online at all until the market approaches the value of their pre-bids. This is a situation unique to auctions in industrial markets where the buyer can award to a non-low bidding supplier (switching costs and non-price variables establish "stickiness" in bidding behavior). Without the leaders bidding at all, there may not be enough competition to drive the online auction to its potential. Possibly, no new bids will be received online at all. The buyer an online auction can set up such that individual bidders have different limits on the bids that will be accepted during the course of the auction. For an upward auction, the seller may set different floor prices for different bidders. For a downward auction, individual ceiling prices can be established for bidders. This avoids the "buyer's (or seller's) regret" associated with the market-wide bid limitations described above.

Consider the following example illustrated in Table 9. In this example, the buyer had collected a "Round 1" series of pre-bids (in confidence) which are listed below in Table 9.

TABLE 9

| | | Historic Price = $10,564,300 | | | | |
|---|---|---|---|---|---|---|
| | | Pre-bid Results | | | Actual Online Auction Results (w/Bidder-Specific Bid Limitations) | |
| Rank | Bidder | Bid | Savings (%) | Bidder | Bid | Savings (%) |
| 1 | Supplier A | $ 8,515,383 | 19.4% | Supplier A | $8,352,524 | 20.9% |
| 2 | Supplier B | $ 9,129,639 | 13.6% | Supplier B | $8,463,769 | 19.9% |
| 3 | Supplier C | $ 9,635,396 | 8.8% | Supplier C | $8,674,775 | 17.9% |
| 4 | Supplier D | $10,289,320 | 2.6% | Supplier D | $9,465,808 | 10.4% | in this case has lost the potential for the interactivity of the auction to produce a better result.

Second, if the rules of the online auction require the buyer to forego the pre-bids (for example, to avoid the problem described in (a)), then the leaders can start much higher than their pre-bids. In fact, the low bidding pre-bidder only needs to bid slightly lower than second place. If there was a significant gap between the pre-bids in first and second place, the leader may never be driven to bid online nearly as low as the pre-bid. The buyer will experience regret at not having taken the original low bid.

A second option is to set a ceiling at the lowest bid. In this case, some suppliers may be prevented from bidding because they cannot meet the ceiling. This does not matter if the buyer is indifferent over which supplier to award to (the buyer awards to the lowest bidder either at the ceiling or the market price if bidding goes below the ceiling). However, in industrial business-to-business auctions it is not uncommon for the buyer to choose a non-low bidding supplier (switching costs and non-price variables affect the final decision). Many suppliers who did not have the lowest bid prior to the online auction may want to reduce their bid to close the gap on the lowest placed bidder. They may not be able to match the lowest bid, but they may be able to improve their position. However, the ceiling in the online auction prevents them from bidding at all. Thus, the buyer loses the benefit of receiving the lowest bid possible from such suppliers.

A third option is to set a ceiling somewhere between the lowest and highest bid. Now the buyer is exposed to both of the problems outlined above, and must "second guess" the bidders as to the "best" level to set the ceiling. Note that this is a problem unique to industrial business-to-business markets. In most other auction situations, the market-leading bid automatically wins, and setting the ceiling at the lowest bid would be perfectly acceptable. It is only because of the fact that the buyer can award to any participant in the market, and may prefer a supplier who is not the lowest, that this problem arises.

The bidder-specific bid limitations feature addresses the shortcomings of market-wide bid ceilings. With this feature, While the bids from Suppliers A and B were more attractive, the buyer actually preferred to deal with either Supplier C or D, who would not lower their price any further through manual negotiation. The buyer decided to hold an online auction but wanted to ensure that suppliers would not start bidding higher than their pre-bids. Since the bids were received in confidence (as is often the case), the buyer could not simply enter opening bids equal to their previous best "on behalf" of the suppliers.

An online auction is then conducted on the basis that the pre-bids would be foregone, and only a supplier who participated in the online auction would be awarded the business. Accordingly, all suppliers would have to re-bid to win the business. Instead of a market-wide ceiling, individual bid ceilings were established for each supplier equal to their pre-bid. For example, Supplier B could submit a bid online equal to or below $9,129,639, but not higher. The individual bid ceilings are not visible to the other suppliers. The result of the online auction with bidder-specific bid limitations is also shown in Table 9.

As illustrated, all suppliers lowered their bids as a result of the online auction. Note that suppliers C and D did not drop their bids to meet the lowest bidder, but reduced their quote to a "walk-away" bid substantially lower than their offline bids. However, it is clear that if the buyer had established a market-wide ceiling at the lowest offline bid ($8,515,383), Suppliers C and D would not have been able to bid at all. The buyer would have lost the opportunity to award one of the preferred suppliers (Supplier C), at a bid that is $960,621 better than the offline bid ($9,635,396 less $8,674,775). In an industrial supply market, the difference between Supplier C ($8,674,775) and Supplier A ($8,352,524) may not justify the intangible risk and qualification costs of switching from a trusted supplier to a new source.

Consider also the (hypothetical) outcome shown in Table 10 below.

TABLE 10

Historic Price = $10,564,300

| | Pre-bid Results | | | Actual Online Auction Results (w/Bidder-Specific Bid Limitations) | | |
|---|---|---|---|---|---|---|
| Rank | Bidder | Bid | Savings (%) | Bidder | Bid | Savings (%) |
| 1 | Supplier A | $ 8,515,383 | 19.4% | Supplier A | $8,515,383 | 19.4% |
| 2 | Supplier B | $ 9,129,639 | 13.6% | Supplier B | $8,874,012 | 16.0% |
| 3 | Supplier C | $ 9,635,396 | 8.8% | Supplier C | $8,821,191 | 15.5% |
| 4 | Supplier D | $10,289,320 | 2.6% | Supplier D | $9,465,808 | 10.4% |

In this example, as a result of the online auction, Suppliers B, C and D lowered their bids to the "walk-away prices" assumed above. Supplier A did not lower their bid but were forced (by the bidder-specific bid limitations feature) to place a bid equal to the bid placed offline. If they did not bid at all, according to the auction rules they would have been ineligible for an award.

Consider the potential outcomes in the absence of a bidder-specific bid limitations feature. In a first scenario, the buyer establishes a market-wide ceiling at the lowest offline bid ($8,515,383). The result is shown below in Table 11.

In this case, Suppliers B, C and D compete by lowering their quotes in response to bids placed by the other suppliers until they each reach their walk-away price. Once they reach their walk-away price they stop bidding. When the lowest bid reaches Supplier B's walk-away price ($8,874,012), all suppliers cease to bid except for Supplier A. Supplier A places one bid just below Supplier B to reach first place. With no response from Supplier B, the auction closes. The buyer has lost the potential to extract an additional $348,065 from Supplier A ($8,863,44& less $8,515,383).

TABLE 11

Historic Price = $10,564,300

| | Pre-bid Results | | | Online Auction Results (w/Bidder-Specific Bid Limitations) | | |
|---|---|---|---|---|---|---|
| Rank | Bidder | Bid | Savings (%) | Bidder | Bid | Savings (%) |
| 1 | Supplier A | $ 8,515,383 | 19.4% | Supplier A | $8,515,383 | 19.4% |
| 2 | Supplier B | $ 9,129,639 | 13.6% | Supplier B | No bid | 0% |
| 3 | Supplier C | $ 9,635,396 | 8.8% | Supplier C | No bid | 0% |
| 4 | Supplier D | $10,289,320 | 2.6% | Supplier D | No bid | 0% |

In this case, all suppliers would have been prevented from submitting a bid online, except for Supplier A. The buyer may still be able to accept the offline bids, but at best they lose the opportunity to receive a better bid from Supplier B, C and D.

In a second scenario, the buyer establishes a market-wide ceiling at the highest offline bid ($10,289,320), and chooses to forego the right to accept the offline bids. The result is shown below in Table 12.

In a third scenario, the buyer establishes a market-wide ceiling at the highest offline bid ($10,289,320), and chooses to retain the right to accept the offline bids. In this case, the outcome is highly dependent on the behavior and beliefs of the individual bidders. In the worst possible scenario, all suppliers are highly confident of their offline bids and see no reason to place a bid until they are challenged by a better bid online. In this situation, it is possible that no-one places a bid,

TABLE 12

Historic Price = $10,564,300

| | Pre-bid Results | | | Online Auction Results (w/Bidder-Specific Bid Limitations) | | |
|---|---|---|---|---|---|---|
| Rank | Bidder | Bid | Savings (%) | Bidder | Bid | Savings (%) |
| 1 | Supplier A | $ 8,515,383 | 19.4% | Supplier A | $8,863,448 | 16.1% |
| 2 | Supplier B | $ 9,129,639 | 13.6% | Supplier B | $8,874,012 | 16.0% |
| 3 | Supplier C | $ 9,635,396 | 8.8% | Supplier C | $8,926,834 | 15.5% |
| 4 | Supplier D | $10,289,320 | 2.6% | Supplier D | $9,465,808 | 10.4% | each supplier waiting for someone else to make a move. The market closes with no activity and the buyer loses all potential gains from an interactive auction (Table 10).

In the best possible situation, Supplier A does not realize they have the leading bid and is concerned that someone else is better placed. Supplier A would likely place a bid above their walk-away price. Assume A places a bid at $9,200,000, above B's offline bid but below C and D's. D responds with their walk-away bid, $9,465,808 (the best they can do). C responds and continues to bid against A until the leading bids go below B's offline bid. At this point B is drawn into the competition. Bidding will likely continue until B and C reach their walk-away prices. At this point, A does not need to bid further online, but will be bound to honor their pre-bid. The buyer has achieved all of the gains of Table 6.

A range of other scenarios could also arise, depending on how the bidders behave and what the relative walk-away prices and offline bids are. If C and D had walk-away prices above B's offline bid, then C, D, and A would have stopped bidding before B was drawn into the competition. In which case, the result could have been considerably worse. The point here is that using an online auction can be risky for the buyer in some situations, due to the potential to share among suppliers data that might be better withheld. Bidder-specific bid limitations help achieve the optimal outcome.

Error Detection and Prevention

It is not uncommon for a bidder to make errors when placing bids during an auction. The prior system prevented some of these errors through the use of a confirmation pop-up box on the bidder's user interface. When a bidder submits a bid, the software presents a confirmation pop-up box to the bidder, as shown in FIG. 15A. This box repeats the lot and bid amount, and asks the bidder to confirm that this information is correct prior to sending the bid across the network to the auction server. The bidder must either confirm the bid by clicking on the "confirm" button or cancel the bid using the "cancel" button. Failure to take action at this point will result in no bid being entered. Once a bid is confirmed and sent to the auction server, it is entered into the online auction and market information from that bid is displayed to all bidders.

However, the confirmation pop-up box is self-governing. It only helps in situations where the bidder believes the bid is incorrect; there is no system-based intelligence in the confirmation pop-up box. Therefore, some bidders have entered erroneous bids even though they had to confirm the bids. The pace of the auction, and bidding on multiple lots simultaneously allows for bidder errors. Because erroneous bids affect the critical integrity of the auctions, additional error detection and prevention features were developed using system-based intelligence.

One additional layer of protection is through failsafe functionality. Failsafe rules allow the auction coordinator to limit the bidders' ability to enter certain bids. The consequences for breaking these rules can also be established up front. First, a bidder may be required to make additional bid confirmations (beyond the first confirmation pop-up box) prior to submission and acceptance of the bid. Second, a bidder may be prevented entirely from entering bids that fail certain predefined criteria. One feature of the present invention is the ability to flexibly pre-define failsafe criteria, and flexibly predefine consequences if that criteria is met, all in relation to specific online auctions and different lots within an auction.

In one embodiment, the failsafe rules are implemented by the server component. In an alternate embodiment, the failsafe rules are implemented by the client component.

Another error prevention feature is the override function. Override allows the auction coordinator to override or remove erroneous bids from the auction in real-time. A bid can be quickly and efficiently removed before it prejudices the positions of other bidders. If a second bidder has already bid in response to an erroneous bid, all consequential bids can be removed as well. Accordingly, auctions can be completed by picking up from the point of the last valid bid, rather than starting over.

If a bid is overridden, the auction coordinator warns the bidders that an erroneous bid has been received and removed through a message that is sent to every bidder and appears as a warning on their user interface. The auction coordinator types in a text message and send it to each bidder over the same network that is running the auction. Message boxes appear on bidding screens and bidders must click "OK" before they can continue to bid.

As an example of these two features, Suppliers B, C, D, & E are engaged in a competitive interaction on Lot 1 of a multi-lot auction between 1:25 PM and 1:27:30 PM at a price between $1.5 to $1.6 million. The lot is scheduled to close at 1:40 PM, as shown in Table 13.

TABLE 13

| Bidder | Bid Time | LOT 1 - Historic Price = $1,768,334 | |
|---|---|---|---|
| | | Bid | Savings (%) |
| Supplier A | 1:07:59 PM | $1,801,048 | (1.85%) |
| Supplier B | 1:25:07 PM | $1,585,190 | 10.36% |
| Supplier C | 1:25:49 PM | $1,563,522 | 11.58% |
| Supplier D | 1:26:32 PM | $1,555,230 | 12.05% |
| Supplier C | 1:27:10 PM | $1,549,674 | 12.37% |
| Supplier E | 1:27:30 PM | $1,542,899 | 12.75% |

Prior to the opening of the auction, the auction coordinator activated three failsafe rules. First, once a bidder has placed an initial bid, they may not bid more than 20% below their immediately preceding bid. In this example, the rule is defined so that a bidder is prevented from submitting such a bid at all. Second, bidders may not place a bid more than 10% below the current market leading bid. A bid that is below this level activates a warning box displayed in FIG. 15B. Bidders must confirm such a bid for a second time before it will be submitted. Third, no bid more than 70% below historic price will be accepted at any point throughout the auction.

Supplier F decides to commence bidding on Lot 1. On their opening bid, Supplier F omits a zero from the bid amount, entering $153,507 instead of $1,525,070. This is an opening bid 91% below historic and 78% below market, thereby violating the second and third rules. Supplier F is prevented from entering this bid.

Next Supplier F enters the bid of $1,525,070. This bid does not violate any failsafe rule and is accepted. Supplier C responds with a lower bid and the market is now as shown in Table 14.

TABLE 14

| Bidder | Bid Time | LOT 1 - Historic Price = $1,768,334 | |
|---|---|---|---|
| | | Bid | Savings (%) |
| Supplier A | 1:07:59 PM | $1,801,048 | (1.85%) |
| Supplier B | 1:25:07 PM | $1,585,190 | 10.36% |
| Supplier C | 1:25:49 PM | $1,563,522 | 11.58% |
| Supplier D | 1:26:32 PM | $1,555,230 | 12.05% |
| Supplier C | 1:27:10 PM | $1,549,674 | 12.37% |
| Supplier E | 1:27:30 PM | $1,542,899 | 12.75% |
| Supplier F | 1:28:46 PM | $1,535,070 | 13.19% |
| Supplier C | 1:29:15 PM | $1,533,894 | 13.26% |

Supplier F attempts to respond quickly, entering $1,158,000 instead of $1,518,000. This bid is over 20% below the last bid placed by Supplier F, and more than 10% below the market, This bid violates the first and second failsafe rules, and Supplier F is prevented from entering this bid at all. Supplier F corrects this mistake and enters their best and final bid for this lot ($1,518,000).

Supplier F begins monitoring the activity on other lots and decides to place a bid of $1,354,200 in Lot 2, but inadvertently places the bid in Lot 1. This bid is not greater than 20% below the previous bid, nor is it more than 10% below the current market leading bid. Accordingly, none of the failsafe rules are activated and the bid is entered.

Supplier F immediately recognizes the mistake and contacts the auction coordinator. After confirming that this is a bona fide error, the auction coordinator warns the other participants that the latest bid from Supplier F is erroneous and activates the override feature. The bid is removed from the online auction.

Bidding continues on this lot without a disruption in the auction process, and without prejudicing the position of the other bidders.

The operation of the error detection features are illustrated in the flow chart in FIG. 15, as shown in process 800. A bidder enters a bid at step 810. A confirmation box is then displayed to the bidder at step 820. An example of the bid confirmation box is shown in FIG. 15A. If the bidder decides not to enter the bid in step 830, then the bid is canceled, and the bidder can then enter another bid in step 810. If the bidder confirms the bid at step 830, then the bid is checked against predefined failsafe criteria at step 840. The first check is to see if the bid fails predefined criteria that prevents the bid from being entered entirely. If the bid does fail this first test, then a message, such as the one in FIG. 15B, is displayed to the bidder in step 845, and the bidder must reenter the bid at step 810. If the bid passes the first failsafe criteria, then a second check is performed at step 850. For this second level of predefined criteria, if the bid fails to pass, then the bidder may still enter the bid if he confirms it again at step 855. An example of the reconfirmation box is shown in FIG. 15C. If the bidder reconfirms the bid, then is entered into the auction at step 860. If the bid passed the reconfirmation failsafe criteria at step 850, then no reconfirmation is needed, and the bid is entered into the auction at step 860. The entire process 800 is repeated for every bid that is submitted in the auction.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions the auction functions can be equally applied to upward pricing auctions. Thus, it is intended that the present invention cover the modifications and variations of this invention provided they come within the scope of the appended claims and their equivalents.

What is claimed is:

1. A system to control overtime in an auction, comprising:
    a processor configured to:
        define a first time interval corresponding to at least a portion of time during which bids are submitted to the auction for a first lot defined at least in part by a buyer, a second time interval, and a first closing time for the first lot, wherein the first closing time is at least initially defined as a specified scheduled closing time;
        determine that at least one new bid for the first lot is received during the first time interval, the at least one new bid being received within a triggering interval;
        determine a correlation between a rank of the at least one new bid and a rank of at least one other bid previously received for the first lot; and
        extend the first closing time using the second time interval if the correlation between the at least one new bid and the at least one other bid satisfies a trigger criterion that is based on a rank of the at least one new bid and the at least one other bid; and
    a memory coupled to the processor and configured to provide the processor with instructions;
    wherein the first closing time corresponds to an end of the first time interval if the first closing time is not extended, and the first closing time corresponds to an end of the second time interval if the first time interval is extended.

2. The system of claim 1 wherein the second time interval varies during the auction.

3. The system of claim 1 wherein the second time interval is determined in accordance with an overtime extension parameter that is specific to the first lot.

4. The system of claim 1 wherein the trigger criterion further requires that an amount of the at least one new bid be within a predetermined, amount of the at least one other bid for the first lot.

5. The system of claim 1 wherein the trigger criterion further requires that the at least one new bid be within a predetermined rank of the at least one other bid for the first lot.

6. The system of claim 1 wherein the trigger criterion further requires that the at least one new bid be within a predetermined percentage of the at least one other bid for the first lot.

7. The system of claim 1 wherein the trigger criterion further requires that the at least one new bid be received from an incumbent supplier.

8. A system to control overtime in an electronic auction, comprising:
    a processor configured to:
        define a first time interval, a second time interval, and a first closing time for a lot defined at least in part by a buyer, wherein the first closing time is at least initially defined as a specific scheduled closing time;
        determine that at least one new bid for the first lot is received, the at least one new bid being received within a triggering interval;
        determine a correlation between a rank of the at least one new bid and a rank of at least one other bid previously received for the first lot; and
        extend the first closing time using the second time interval if the correlation between the at least one new bid and the at least one other bid satisfies a trigger criterion that is based on a rank of the at least one new bid and the at least one other bid; and
    a memory coupled to the processor and configured to provide the processor with instructions.

9. The system of claim 8 wherein the second time interval varies during the auction.

10. The system of claim 8 wherein the trigger condition requires that the at least one new bid be within a predetermined amount of the at least one other bid for the lot.

11. The system of claim 8 wherein the trigger condition requires that the at least one new bid be within a predetermined rank of the at least one other bid for the lot.

12. The system of claim 8 wherein the trigger condition requires that the at least one new bid be within a predetermined percentage of the at least one other bid for the lot.

13. The system of claim 8 wherein the first time interval comprises an overtime trigger interval before the first closing time.

14. The system of claim 8 wherein the second time interval comprises an overtime extension interval that extends the first closing time.

15. The system of claim 8 wherein the second time interval extends to a second closing time, and wherein the processor is further configured to:
define a third time interval, a fourth time interval, and a second overtime condition for the lot, the third time interval not being equal to the fourth time interval;
determine whether the second overtime condition occurs during the third time interval; and
extend the second closing time by the fourth time interval in accordance with the second determination.

16. A system for controlling overtime in an electronic auction, comprising:
a processor configured to:
define an overtime triggering interval, an extension time interval, and a closing time for a lot defined at least in part by a buyer, wherein the closing time is at least initially defined as a specific scheduled closing time;
determine whether at least one new bid for the lot is received during the overtime triggering interval;
determine a correlation between a rank of the at least one new bid and a rank of at least one other bid previously received for the lot; and
extend the closing time using the extension time interval if the correlation between the at least one new bid and the at least one other bid satisfies a trigger criterion that is based on a rank of the at least one new bid and the at least one other bid; and
a memory coupled to the processor and configured to provide the processor with instructions.

17. The system of claim 16, wherein the trigger criterion further requires that the at least one new bid be within a predetermined amount of the at least one other bid for the lot.

18. The system of claim 16, wherein the trigger criterion further requires that the at least one new bid be within a predetermined rank of the at least one other bid for the lot.

19. The system of claim 16, wherein the trigger criterion further requires that the at least one new bid be within a predetermined percentage of the at least one other bid for the lot.

20. The system of claim 16, wherein the trigger criterion is satisfied if the at least one new bid is submitted by an incumbent supplier.

\* \* \* \* \*

UNITED STATES PATENT AND TRADEMARK OFFICE
CERTIFICATE OF CORRECTION

| | | |
|---|---|---|
| PATENT NO. | : 7,792,707 B2 | |
| APPLICATION NO. | : 11/974523 | |
| DATED | : September 7, 2010 | |
| INVENTOR(S) | : Alaia et al. | |

It is certified that error appears in the above-identified patent and that said Letters Patent is hereby corrected as shown below:

Column 28, Line 25, Claim 4:
delete "," after predetermined

Signed and Sealed this
Eighteenth Day of December, 2012

David J. Kappos
*Director of the United States Patent and Trademark Office*